(12) United States Patent
Shah

(10) Patent No.: US 11,897,506 B1
(45) Date of Patent: Feb. 13, 2024

(54) VEHICLE RIDE DYNAMICS ACTIVE COMFORT TUNING SYSTEM

(71) Applicant: Zoox, Inc., Foster City, CA (US)

(72) Inventor: Prateek Chandresh Shah, San Francisco, CA (US)

(73) Assignee: ZOOX, INC., Foster City, CA (US)

( * ) Notice: Subject to any disclaimer, the term of this patent is extended or adjusted under 35 U.S.C. 154(b) by 362 days.

(21) Appl. No.: 17/216,547

(22) Filed: Mar. 29, 2021

(51) Int. Cl.
*B60W 60/00* (2020.01)
*G05D 1/02* (2020.01)
*B60W 50/14* (2020.01)

(52) U.S. Cl.
CPC ........ *B60W 60/0013* (2020.02); *B60W 50/14* (2013.01); *G05D 1/0212* (2013.01); *B60W 2050/146* (2013.01); *B60W 2510/225* (2013.01); *B60W 2520/06* (2013.01); *B60W 2520/105* (2013.01); *B60W 2520/125* (2013.01); *B60W 2710/226* (2013.01); *B60W 2720/106* (2013.01); *B60W 2720/125* (2013.01)

(58) Field of Classification Search
CPC ............. B60W 60/0013; B60W 50/14; B60W 2050/146; B60W 2510/225; B60W 2520/06; B60W 2520/105; B60W 2520/125; B60W 2710/226; B60W 2720/106; B60W 2720/125; G05D 1/0212
See application file for complete search history.

(56) References Cited

U.S. PATENT DOCUMENTS

| RE34,628 E | 6/1994 | Fujishiro |
|---|---|---|
| 7,749,045 B1* | 7/2010 | Namanny ............... A63H 18/12 446/454 |
| 9,738,125 B1 | 8/2017 | Brickley et al. |
| 9,746,985 B1 | 8/2017 | Humayun et al. |
| 11,623,597 B1 | 4/2023 | Jost et al. |
| 11,648,952 B2 | 5/2023 | Eike et al. |
| 2007/0213898 A1* | 9/2007 | Saito .................. B60G 17/0195 701/37 |
| 2012/0205169 A1* | 8/2012 | Montocchio ............ B60T 10/02 180/54.1 |
| 2014/0222287 A1 | 8/2014 | Popham et al. |
| 2014/0284122 A1 | 9/2014 | Hirata |
| 2015/0343874 A1 | 12/2015 | Kurata et al. |
| 2016/0046167 A1 | 2/2016 | Lenain |
| 2017/0008526 A1 | 1/2017 | Ko |
| 2017/0100980 A1 | 4/2017 | Tsuda |
| 2017/0233000 A1 | 8/2017 | Fujimoto et al. |
| 2018/0162186 A1* | 6/2018 | Anderson ............ B60G 99/002 |
| 2018/0259496 A1 | 9/2018 | McPeek |
| 2018/0341822 A1* | 11/2018 | Hovis ................... G06F 18/251 |
| 2018/0362049 A1 | 12/2018 | Avireddi et al. |
| 2019/0047574 A1 | 2/2019 | Nishi et al. |

(Continued)

*Primary Examiner* — Nicholas Kiswanto
*Assistant Examiner* — Madison B Emmett
(74) *Attorney, Agent, or Firm* — Lee & Hayes P.C.

(57) ABSTRACT

A vehicle may include an active ride comfort tuning system that reactively and/or proactively alters a parameter of a system of the autonomous vehicle to mitigate or avoid interruptions to ride smoothness. For example, the comfort tuning system may alter a parameter of a drive system, suspension, and/or a trajectory cost function. The comfort tuning system may alter the parameter based at least in part on detecting and/or receiving a comfort indication, determined based on sensor data, user input, or the like.

20 Claims, 7 Drawing Sheets

(56) References Cited

U.S. PATENT DOCUMENTS

| | | |
|---|---|---|
| 2019/0079539 A1 | 3/2019 | Sridhar et al. |
| 2019/0152488 A1 | 5/2019 | Kotteri et al. |
| 2019/0210471 A1 | 7/2019 | Janzen |
| 2020/0139784 A1 | 5/2020 | Sridhar et al. |
| 2020/0307437 A1* | 10/2020 | Thieberger ............ B62D 47/006 |
| 2021/0078603 A1 | 3/2021 | Nakhaei Sarvedani et al. |
| 2021/0284194 A1* | 9/2021 | Kijima ................ B60W 50/038 |
| 2021/0335064 A1 | 10/2021 | Kim et al. |
| 2021/0362806 A1 | 11/2021 | Hedlund et al. |
| 2022/0032709 A1 | 2/2022 | Lee et al. |
| 2022/0032961 A1* | 2/2022 | Liu .................... B60W 60/0011 |
| 2022/0097728 A1* | 3/2022 | Lin ........................ G06N 20/00 |
| 2022/0111735 A1 | 4/2022 | Janzen |
| 2022/0188667 A1 | 6/2022 | Burisch et al. |
| 2022/0234408 A1 | 7/2022 | Jonson et al. |
| 2022/0250675 A1* | 8/2022 | Jeong ................ H04L 12/40189 |
| 2022/0281456 A1 | 9/2022 | Giovanardi et al. |
| 2022/0332159 A1 | 10/2022 | Corsico |
| 2023/0043104 A1 | 2/2023 | Abdallah et al. |
| 2023/0073311 A1 | 3/2023 | Andreas et al. |
| 2023/0159040 A1* | 5/2023 | Kamio .............. B60W 50/0205 701/99 |
| 2023/0162532 A1 | 5/2023 | Ratha et al. |

\* cited by examiner

US 11,897,506 B1

VEHICLE RIDE DYNAMICS ACTIVE COMFORT TUNING SYSTEM

BACKGROUND

An autonomous vehicle may include highly complex systems for controlling operations of the vehicle. Such a system may comprise numerous hardware and/or software components, making it difficult to identify which component or components may have contributed to slight fluctuations in motion that affect ride smoothness, such as brief stutters, momentary accelerations or decelerations, momentarily activating a turn signal or headlight, or the like. Something as simple as exchanging a particular piece of hardware for another piece of hardware of a same type or making a minor change to a software component may ultimately cause the autonomous vehicle to operate differently.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
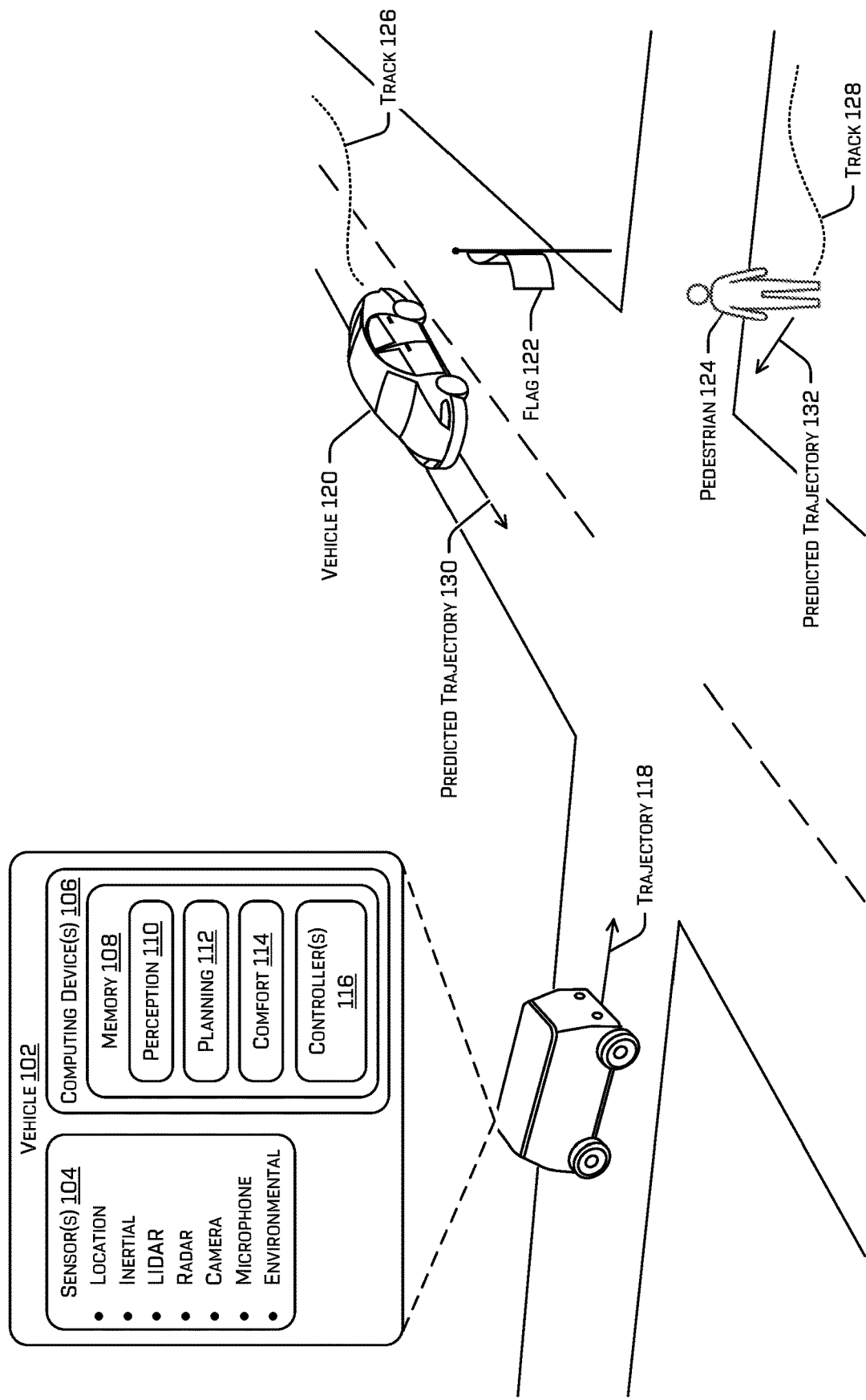
FIG. 1 illustrates an example scenario in which an autonomous vehicle configured with a comfort tuning component may detect an interruption to ride smoothness and may tune a parameter associated with a planning component or drive system of the vehicle to increase ride smoothness.

Techniques for actively tuning an autonomous vehicle to increase ride comfortability may include detecting a transient interruption to ride smoothness of the vehicle and determining a subcomponent that caused or contributed to the interruption. A ride smoothness interruption may include a short tap on the brakes, a momentary acceleration, momentary activation of an emitter of the vehicle (e.g., a turn signal, a speaker, headlights). As used herein, "momentary" may include a time period that is less than a threshold duration of time such as, for example, 10 milliseconds, 0.5 seconds, 1 second, 2 seconds, or any other threshold. In some examples, these thresholds may be different depending on the interruption. For example, the time threshold may be shorter for brake taps (e.g., 10 milliseconds) than for activation of a turn signal (e.g., 1 second, 2 seconds).

The techniques may include receiving a comfort indication that indicates that an interruption to ride smoothness occurred. In some examples, the comfort indication may be determined based at least in part on sensor data. For example, the vehicle may determine, based at least in part on sensor data, that a jerk (i.e., a change in acceleration) meets or exceeds a jerk threshold. In an additional or alternate example, some interruptions to ride smoothness may not result in a jerk that meets or exceeds the jerk threshold but may interrupt ride smoothness anyway. In such an example, user input (e.g., a passenger) may be used to indicate an interruption to ride smoothness. In an additional or alternate example, the vehicle or a remote computing device that receives log data from the vehicle may determine that a trajectory for controlling the autonomous vehicle changed for a length of time that was less than a threshold duration of time. Any of these examples may be combined. For example, the techniques may additionally include determining that a jerk required to effectuate the trajectory compared to a prior trajectory would meet or exceed the jerk threshold. To give a practical example, the vehicle or the remote computing device may determine that the autonomous vehicle was operating according to a trajectory indicating a speed of 25 miles per hour and that, for less than a second, the trajectory determined by the vehicle was an emergency stop maneuver, causing motion of the vehicle to fluctuate, appearing or feeling to hesitate or stutter for a fleeting moment before resuming a speed of 25 miles per hour.

Once a comfort indication has been determined or received, a comfort tuning component may determine a subcomponent that caused or contributed to the interruption to ride smoothness and alter a parameter of the subcomponent or of an action selection component (e.g., arbiter) of the vehicle to increase the ride smoothness. The autonomous vehicle may comprise a planning component that has various action selection components for controlling the different systems of the vehicle. For example, the action selection components may include a trajectory selection component for controlling motion of the vehicle, an action selection component for controlling emitters of the vehicle, a ride action selection component for controlling passenger-related devices of the vehicle (e.g., interior displays, speakers, HVAC, seat heating/cooling), etc. For the sake of simplicity, a trajectory selection component is predominantly discussed herein, although it is understood that many of the techniques may be applied to other types of action selection components.

An action selection component may receive the outputs of one or more subcomponents that handle various aspects of perception and control. For example, the trajectory selection component may receive outputs from a subcomponent that detects traffic lights and determines whether or not to output an indication to stop the vehicle for a yellow or red light, a double-parked vehicle subcomponent that permits the trajectory selection component to select a trajectory associated with an oncoming lane (i.e., in the presence of an object blocking a lane that the vehicle is operating in, see U.S. patent application Ser. No. 15/897,028, filed Feb. 14, 2018), a subcomponent that predicts pedestrian actions and/or determine pedestrian awareness (see U.S. Provisional Patent Application No. 63/028,377, filed May 21, 2020) a subcomponent that generates a set of candidate trajectories for normative operations (see U.S. patent application Ser. No. 16/517,506, filed Jul. 19, 2019 and/or U.S. patent application Ser. No. 16/872,284, filed May 11, 2020), and so on.

The outputs of the subcomponents may comprise a candidate action and/or a value used by the trajectory selection component to select a candidate action for implementation as a trajectory. A candidate action output by a subcomponent may indicate normative operation, in which case the trajectory selection component may select a trajectory from among the candidate trajectories generated by a normative trajectory generation component (see U.S. patent application Ser. No. 16/517,506, filed Jul. 19, 2019 and/or U.S. patent application Ser. No. 16/872,284, filed May 11, 2020). This may be the case for instances where a pedestrian is predicted as paying attention or walking away from a street, a traffic light is green, no double-parked vehicles are detected, no construction zones are detected, etc.

However, a candidate action may alternatively indicate a candidate action configured to override or replace a normative trajectory or to cause the trajectory selection component to select a contingent trajectory for implementation by the vehicle. For example, the contingent trajectory may cause the autonomous vehicle to slow, execute a slow to a stop maneuver, execute an emergency maneuver, execute a pull-over maneuver, execute a lane change, etc. This may be the case when a respective subcomponent detects a red or yellow traffic light, that a pedestrian is likely to enter the roadway, that an object is blocking a lane that the vehicle is operating in, that a vehicle in a next lane is improperly merging into the vehicle's lane, etc.

In some examples, the subcomponent may determine a priority and/or confidence score associated with a candidate action that the trajectory selection component may use to determine which trajectory to select. For example, an emergency maneuver generated because a pedestrian was detected as entering the roadway may be associated with a priority value that overrides any other candidate trajectories.

The action selection component may receive the outputs of the subcomponents and the candidate actions indicated thereby and may select a candidate action for implementation by the vehicle. In some examples, implementing an action may comprise selecting a candidate trajectory, from among multiple candidate trajectories, of a type that is associated with the candidate action. For example, a trajectory generation component may generate a set of normative candidate trajectories, a set of emergency maneuver candidate trajectories, a set of lane change maneuvers, and so on for selection by the trajectory selection component. The trajectory selection component may determine a cost associated with a candidate trajectory and/or candidate action based at least in part on sensor and/or perception data, and/or candidate trajectory(ies) associated with the candidate action, and may select a trajectory for implementation by the vehicle based at least in part on candidate action cost and/or priority.

In at least one example, the trajectory selection component may select a candidate action based at least in part on priority associated with the candidate action and may determine a trajectory for controlling the vehicle, from among a set of trajectories associated with the selected candidate action, based at least in part on a cost. In other words, the priority may determine which candidate action the trajectory selection component selects and cost may be used to determine to select the candidate action (when no overriding priority is output) and/or a trajectory associated with the candidate action.

When a comfort indication has been received, the comfort tuning component may determine a subcomponent that caused or contributed to the ride comfort indication based at least in part on determining that a candidate action and/or value output by the subcomponent resulted in a change to the vehicle trajectory, compared to a prior trajectory, that meets or exceeds a threshold. For example, the change may be a magnitude of an acceleration (e.g., by accelerating or decelerating) required to effectuate the candidate action compared to the prior trajectory, a difference in steering angle required to effectuate the candidate action, and/or the like. In some examples, the comfort tuning component may additionally or alternatively determine that the candidate action was selected by the action selection component for implementation, that the candidate action was implemented for a time period less than a time duration threshold, and/or that implementing the candidate action resulted in a jerk that met or exceeded a jerk threshold. Combining two or more of these factors (e.g., candidate action selection, candidate action transience in time, and/or resultant jerk) may allow the vehicle to detect comfort indications without user input.

In some instances, determining that a subcomponent contributed to an interruption in ride smoothness may comprise determining whether a value output by a subcomponent meets or exceeds a running average of the value output by the subcomponent (or other outlier detection methods), whether a candidate action associated with the value is associated with the comfort indication, etc. For example, a subcomponent for handling pedestrian behavior may momentarily output a value indicating a high likelihood that a pedestrian isn't paying attention or is about to enter a roadway. This value may exceed, by a predefined amount, the running average of the values the subcomponent has output in the last 10 seconds or 30 seconds. In some instances, the value may not be output with a specific candidate action and may be used as part of the cost determination associated with a trajectory. In such an instance, a value indicating a high likelihood of pedestrian distraction or a pedestrian entering the roadway may cause the cost associated with trajectories that result in slowing the vehicle to decrease, thereby increasing the likelihood of such trajectories being selected by the trajectory selection component. The comfort tuning component may determine that the outlying value output by the pedestrian component may have contributed to a ride smoothness interruption when the comfort indication indicates that a brake tap occurred.

Regardless, once the comfort tuning component has determined a subcomponent that caused or contributed to a ride smoothness interruption, the comfort tuning component may alter a parameter associated with the subcomponent, action selection component, and/or drive system. For example, the comfort tuning component may alter a weight associated with the output of the subcomponent in determining a cost associated with trajectories associated therewith, a minimum duration of time (or number of computation cycles) required for a candidate action to be sequentially output by the subcomponent before the action selection component can select the candidate action for implementation, a maximum permitted acceleration and/or jerk associated with a trajectory, a maximum permitted acceleration or jerk associated with transitioning from a prior trajectory to a current trajectory, a gain of the drive system, a dampening coefficient of the drive system, a cost and/or cost function, a parameter of the trajectory generation component, etc. In some examples, the comfort tuning component may not modify the parameter outside of upper and/or lower bounds on the parameter that may be predefined by other techniques to ensure the safety and efficacy of the operation of the vehicle (see U.S. patent application Ser. No. 17/100,787, filed Nov. 20, 2020).

The comfort tuning component may additionally or alternatively determine and/or associate a location, time of day, number of comfort indications received within a time period, identification of the subcomponent, and/or the like with a comfort indication and/or the altered parameter determined in relation thereto. In some examples, the comfort tuning component may transmit the comfort indication, altered parameter, log data, and/or auxiliary data (e.g., the time, location, duration, identification of the subcomponent) to a remote computing device. The remote computing device may have detected the interruption in the first place and/or may handle the parameter tuning, although, in additional or alternate examples, this may be done on vehicle.

Regardless, the remote computing device may determine, based at least in part on a comfort indication and auxiliary data associated therewith, a rule set to associate with the altered parameter. The rule set may indicate a set of sensor data and/or perception data conditions that, when satisfied, cause a vehicle to replace a parameter with an altered parameter. For example, the remote computing device may determine, based at least in part on the comfort indication, a geographical region and/or a weather state to associate with an altered parameter. The remote computing device may transmit the rule set and the altered parameter to a vehicle with instructions to replace a parameter with the altered parameter upon detection of satisfaction of the rule set. For example, a vehicle that receives the altered parameter and the rule set in the example above may detect, based at least in part on sensor data received by the vehicle, that the weather is windy and that the vehicle is located at a geographical location within the geographical region, which may satisfy the rule set and cause the vehicle to switch from a nominal operation by controlling the vehicle based at least in part on the parameter to controlling the vehicle based at least in part on the altered parameter.

In some examples, a comfort indication may be output to a planning component, which may use the comfort indication to select a trajectory. In other words, the comfort indication may itself be used as part of a cost determined in association with a trajectory. The comfort indication may be added to the other costs discussed in U.S. patent application Ser. No. 16/872,284, filed May 11, 2020, the entirety of which is incorporated herein for all purposes.

The techniques discussed herein may improve the ride smoothness of an autonomous vehicle by reducing or eliminating fleeting actions, such as brake taps, brief accelerations, and the like. This may also improve the safety of the vehicle by increasing the predictability of the autonomous vehicle's actions for other entities in the environment, such as drivers of other vehicles. The techniques discussed herein may also improve the safety of an autonomous vehicle by making it easier to detect errors in software and/or hardware systems of the vehicle, such as the subcomponents discussed herein, validate fixes to software and/or hardware, and increase the amount of data available to a planning component for making decisions, among other benefits.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

The autonomous vehicle 102 may provide the sensor data received from such sensor(s) 104 to one or more systems of the autonomous vehicle 102 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 102 within a map, an emitter control component may control exterior emitters (e.g., turn signal(s), headlight(s), taillight(s), speaker(s), microphone(s)), a perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more subcomponents.

Computing device(s) 106 may comprise a memory 108 storing a perception component 110, a planning component 112, a comfort component 114, and/or system controller(s) 116. Although depicted in FIG. 1 for illustrative purposes, it should be understood that the comfort component 114 may reside in/on a separate computing device (or otherwise) than any one or more of the other components. The perception component 110, the planning component 112, the comfort component 114, and/or the controller(s) 116 may include one or more machine-learned (ML) models and/or other computer-executable instructions.

In general, the perception component 110 may determine what is in the environment surrounding the vehicle 102 and the planning component 112 may determine how to operate the vehicle 102 according to information received from the perception component 110 For example, multiple sub-components of the perception component 110 and/or planning component 112 may be used to determine trajectory 118 based at least in part on the perception data and/or other information such as, for example, one or more maps, localization information (e.g., where the vehicle 102 is in the environment relative to a map and/or features detected by the perception component 110), and/or a path generated by a high level mission planner of the planning component 112.

The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. In some examples, the controller(s) 116 may comprise software and/or hardware for actuating drive components of the vehicle 102 sufficient to track the trajectory 118.

In some examples, the perception component 110 may comprise a pipeline of hardware and/or software, which may include one or more GPU(s), ML model(s), Kalman filter(s), and/or the like. The perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, motorist, a delivery truck, a semi-truck, traffic signage, and/or the like. For example, such a detection may be conducted by an object detection component of the perception component 110, which may comprise one or more ML model(s) and/or ML or other processing software and/or hardware pipeline(s). A track may comprise a historical, current, and/or predicted object position, velocity, acceleration, and/or heading.

In the depicted example, the vehicle 102 may detect a vehicle 120, a flag 122, and a pedestrian 124. The vehicle 102 may determine a track 126 associated with the vehicle 120 and a track 128 associated with the pedestrian 124. The perception component 110 may comprise one or more prediction components for handling different object types, such as traffic signage, pedestrians, cyclists, vehicles, construction workers and vehicles, etc. These components may be part of the subcomponents discussed herein or may influence subcomponent outputs. For example, a prediction component of the perception component 110 may comprise an ML model trained to estimate, based at least in part on sensor data and track 126 or track 128 respectively, a predicted trajectory 130 associated with the vehicle or a predicted trajectory 132 associated with the pedestrian 124. An additional or alternate prediction component of the perception component 110 may determine an attentiveness of a driver of the vehicle 120 or the pedestrian 124.

The data produced by the perception component 110 may be collectively referred to as perception data. Once the perception component 110 has generated perception data, the perception component 110 may provide the perception data to the planning component 112.

The planning component 112 may use sensor data and/or the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

The planning component 112 may comprise various subcomponents for handling different types of the perception data and/or different aspects of vehicle control, e.g., action selection component(s) for different vehicle components. For example, the subcomponents may handle different scenarios, perception data types, and/or like, such as a pedestrian subcomponent for determining whether to slow (e.g., including cautiously moving around pedestrians) or stop for a pedestrian, a lane interference subcomponent for determining whether to change lanes to avoid an object that is impinging on the vehicle's lane, a blocking object subcomponent that determines whether to allow the planning component to generate and/or select trajectories associated with a different lane than a current lane (e.g., an oncoming lane in some instances), a subcomponent for determining a pickup location and/or that a person is hailing the vehicle, etc. Note that the above examples include example candidate actions that would alter normative trajectory generation and/or selection, such as slowing, stopping, turning, performing particular maneuvers (e.g., parking, emergency, lane change), etc.

In the depicted example, an interruption to ride smoothness might arise because the autonomous vehicle initially classifies the flag 122 as a pedestrian, perhaps because the flag depicts a person on the flag. The flag 122 might be flapping in the wind and thereby cause the autonomous vehicle to predict the incorrectly classified pedestrian is in the roadway or is predicted to enter the roadway. Shadows cast by the flapping flag 122 and the rapid deformations to the shape of a flapping flag 122 might cause other similar fleeting misclassifications or predictions by the autonomous vehicle. Additionally or alternatively, the predicted trajectory 130 and/or predicted trajectory 132 may change temporarily, causing a subcomponent of the planning component 112. In an additional or alternate example, the perception component 110 may accurately classify and/or estimate predictions associated with the vehicle 120, the flag 122, and/or the pedestrian 124, but one of the planning subcomponents that handles the prediction data may include an error, such as may be caused by stochastic ML models that require further training. If a candidate action is output by one of these subcomponents temporarily (e.g., less than a threshold duration of time), this transient activity may be perceived by passengers and/or driver(s) of other vehicles to be a stutter, lurch, or the like, which may interfere with the smoothness of operation of the vehicle 102. The comfort component 114 may identify the subcomponent, whether a subcomponent of perception component 110 or planning 112, that causes such an interruption to ride smoothness. Note that, although the trajectory generation and selection component of the planning component 112 is particularly addressed, the techniques may be extended to an emitter action selection component, ride action selection component, etc.

Comfort component 114 may detect or receive a comfort indication indicating that an interruption to the ride smoothness has occurred. In some examples, the comfort indication may indicate a type of interruption, such as an acceleration, deceleration, steering change, or the like, and/or may be more specific to include information such as sensor data associated therewith and/or whether the brakes were activated. In some examples, the comfort indication may be associated with a geographical location, duration, number of other comfort indications that have been received/detected within a time frame, and/or a time and/or a computational cycle associated with the comfort indication. In an example where user input generated the comfort indication, such as by passenger or a developer testing a simulated vehicle or the vehicle in the real world, the comfort indication may be associated with a time and the comfort component 114 may determine a range of computational cycles (and log data associated therewith) that is associated with the time in order to narrow the search for the trajectory and/or subcomponent that caused the interruption.

The comfort component 114 may actively tune parameter(s) of operation of the vehicle and/or the comfort component 114 may transmit the comfort indication and log data to a remote computing device, which may determine an alteration to the parameter(s) of the operation of the vehicle. In an example where the vehicle 102 is operating in a developer mode, the vehicle 102 may display, via one or more displays of the vehicle, such as in the passenger compartment, an indication of the subcomponent that generated the interruption. Such a display or other input/output devices may be used to receive user input indicating a ride smoothness interruption. Additional details regarding operations of the comfort component 114 are discussed herein with reference to the figures.

Example System

Figure 2:
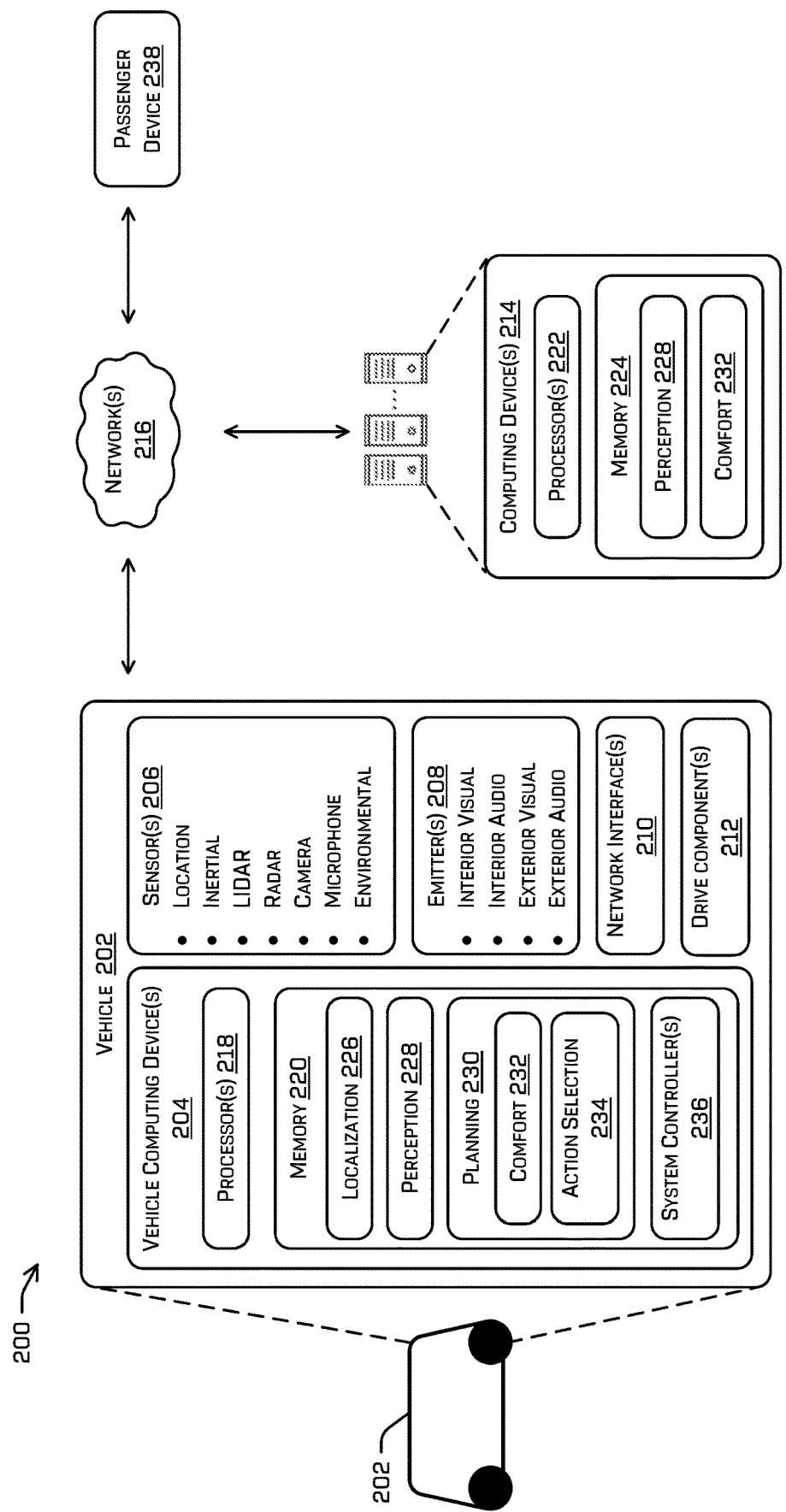
FIG. 2 illustrates a block diagram of an example system comprising a comfort tuning component.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, comfort component 232, action selection component(s) 234, and/or system controller(s) 236. Perception component 228 may represent perception component 110, planning component 230 may represent planning component 112, comfort component 232 may represent comfort component 114, and/or system controller(s) 236 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the planning component 230 and/or action selection component 234, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The comfort component 232 may operate on the vehicle 202 and/or on the computing device(s) 214. In some examples, the comfort component 232 may be downstream (receive an output) from the perception component 228 and/or planning component 230 in a pipeline, although in at least one example the comfort component 232 may be part of and/or alter parameter(s) of the perception component 228 and/or the planning component 230. In examples where at least part of the comfort component 232 executes on computing device(s) 214, log data received from one or more vehicles may be used to detect a ride smoothness interruption. In some examples, the log data may comprise sensor data, perception data, planning data, comfort indication(s), altered parameter(s) determined by the vehicle (in an example where the vehicle 202 determines altered parameter(s), candidate action(s), etc. In some examples, the comfort component 232 executing on the computing device(s) 214 may determine the altered parameter(s) instead of the comfort component 232 executing on the vehicle 202 although in some examples the comfort component 232 executing on the computing device(s) 214 may modify or confirm altered parameter(s) determined by the vehicle 202.

The action selection component 234 may receive output(s) from one or more subcomponents of the planning component 230 and may additionally or alternatively receive perception data from the perception component 228 and/or sensor data. In at least one example, the planning component 230 may comprise a nominal trajectory generation subcomponent that generates a set of candidate trajectories, from which the action selection component 234 selects a trajectory for implementation by the drive component(s) 212 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which is incorporated herein for all purposes.

However, the action selection component 234 may, instead, select an alternate trajectory based at least in part on receiving a candidate action from another of the subcomponents of the planning component 230 that is associated with a priority that exceeds nominal operating conditions. For example, candidate action(s) of a pedestrian subcomponent may be associated with a greater priority than the nominal operation candidate trajectories so that, the action selection component 234 may use the nominal candidate trajectories until or unless the pedestrian subcomponent "goes high"/outputs a candidate action and/or outputs a value that meets or exceeds a threshold, such as a confidence score that meets or exceeds a threshold that indicates that a pedestrian is likely to enter the roadway. In other words, action selection component 234 may function as an arbiter between nominal candidate trajectories, different potential candidate actions if multiple are received at once, and/or candidate trajectory(ies) associated with a candidate action.

In some examples, the action selection component 234 may comprise different action selection components associated with different systems discussed herein a trajectory selection component that determines a trajectory provided to the system controller(s) 236 for controlling motion of the autonomous vehicle via the drive component(s) 212, an emitter action selection component for controlling emitter(s) 208, a network action selection component for controlling network interface(s) 210, a ride action selection component that controls passenger-facing components of the vehicle (e.g., doors, interior displays, HVAC, speakers, window tinting), etc.

The memory 220 and/or 224 may additionally or alternatively store a mapping system (e.g., generating a map based at least in part on sensor data), a planning system, a ride management system, etc. Although localization component 226, perception component 228, planning component 230, comfort component 232, action selection component(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the comfort component 232, the action selection component 234, and/or other components of the system 200 may comprise one or more ML models. For example, the localization component 226, the perception component 228, the planning component 230, the comfort component 232, and/or the action selection component 234 may each comprise different ML model pipelines. The comfort component 232 may use a first ML model to identify a subcomponent that caused or contributed to an interruption and/or a second ML model that tunes parameter(s) associated with operation of the vehicle to reduce ride smoothness interruptions. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on a parameter or altered parameter and perception data generated by the perception component 228 and transmit the instructions to the system controller(s) 236. The system controller(s) 236 may control operation of the vehicle 202 based at least in part on the instructions received from the planning component 230 and/or based at least in part on an altered parameter received from the comfort component 232, such as an altered gain (e.g., for steering rate, acceleration, braking rate) and/or dampening coefficient (e.g., also for steering rate, acceleration, braking rate, and/or for suspension).

In an additional or alternate example, vehicle 202 and/or computing device(s) 214 may communicate (e.g., transmit and/or receive messages over network(s) 216) with one or more passenger devices, such as passenger device 238. The passenger device 238 may include, for example, a smart phone, portable computer such as a laptop or tablet, wearable device (e.g., smart glasses, smart watch, earpiece), and/or the like. Although the passenger device 238 may be a device associated with a passenger that is discrete from device(s) of the autonomous vehicle, it is contemplated that the passenger device 238 may be a sub-system and/or a device of the vehicle 202. For example, the passenger device 238 may additionally or alternatively comprise a display and/or one or more input/output devices, such as a touchscreen, microphone, speaker, and/or the like. In some examples, the vehicle 202 may transmit messages and/or receive messages from the passenger device 238. According to the techniques discussed herein, the comfort indication may be received from the passenger device 238 in some instances and/or the comfort component 232 may indicate a reason that a comfort indication was generated, regardless of what device generated the comfort indication.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Sensor and/or Perception Data and Ride Smoothness Interruptions

Figure 3:
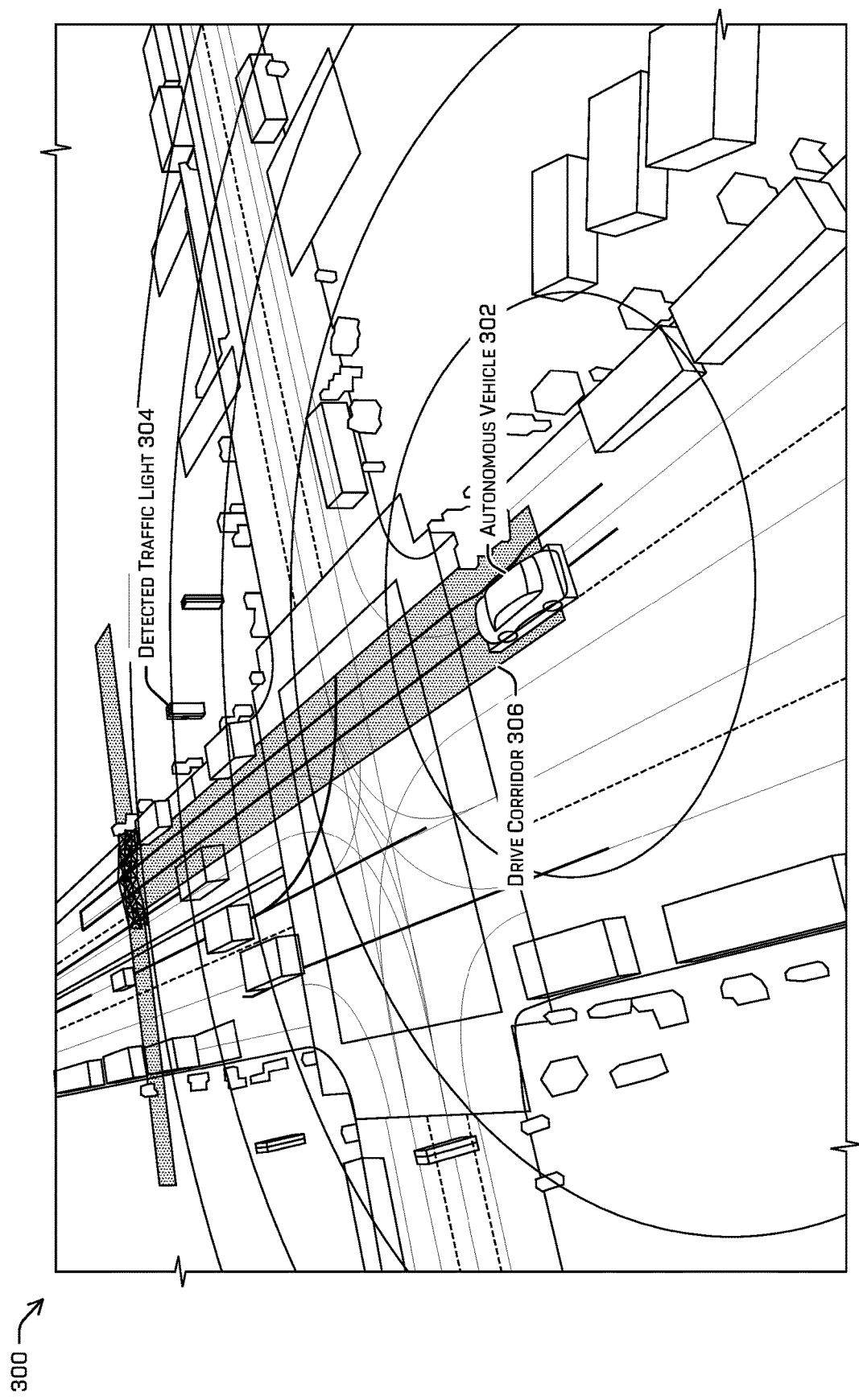
FIG. 3 illustrates a representation of sensor and/or perception data associated with operation of an autonomous vehicle during normative operation.
Figure 4:
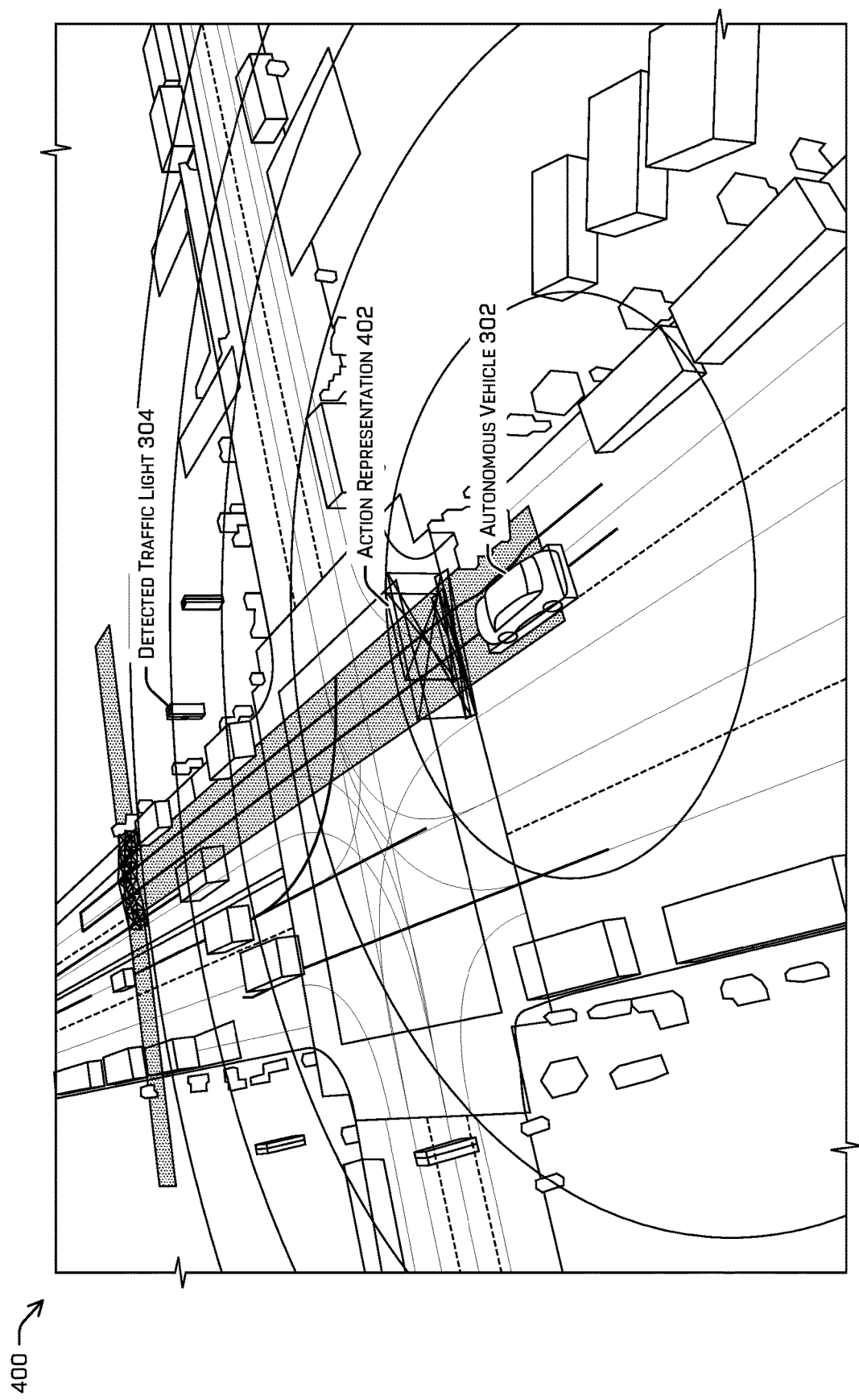
FIGS. 4 and 5 illustrate respective representations of sensor and/or perception data for two scenarios in which a candidate action determined by a subcomponent of the planning component of the vehicle may interrupt ride smoothness.
Figure 5:
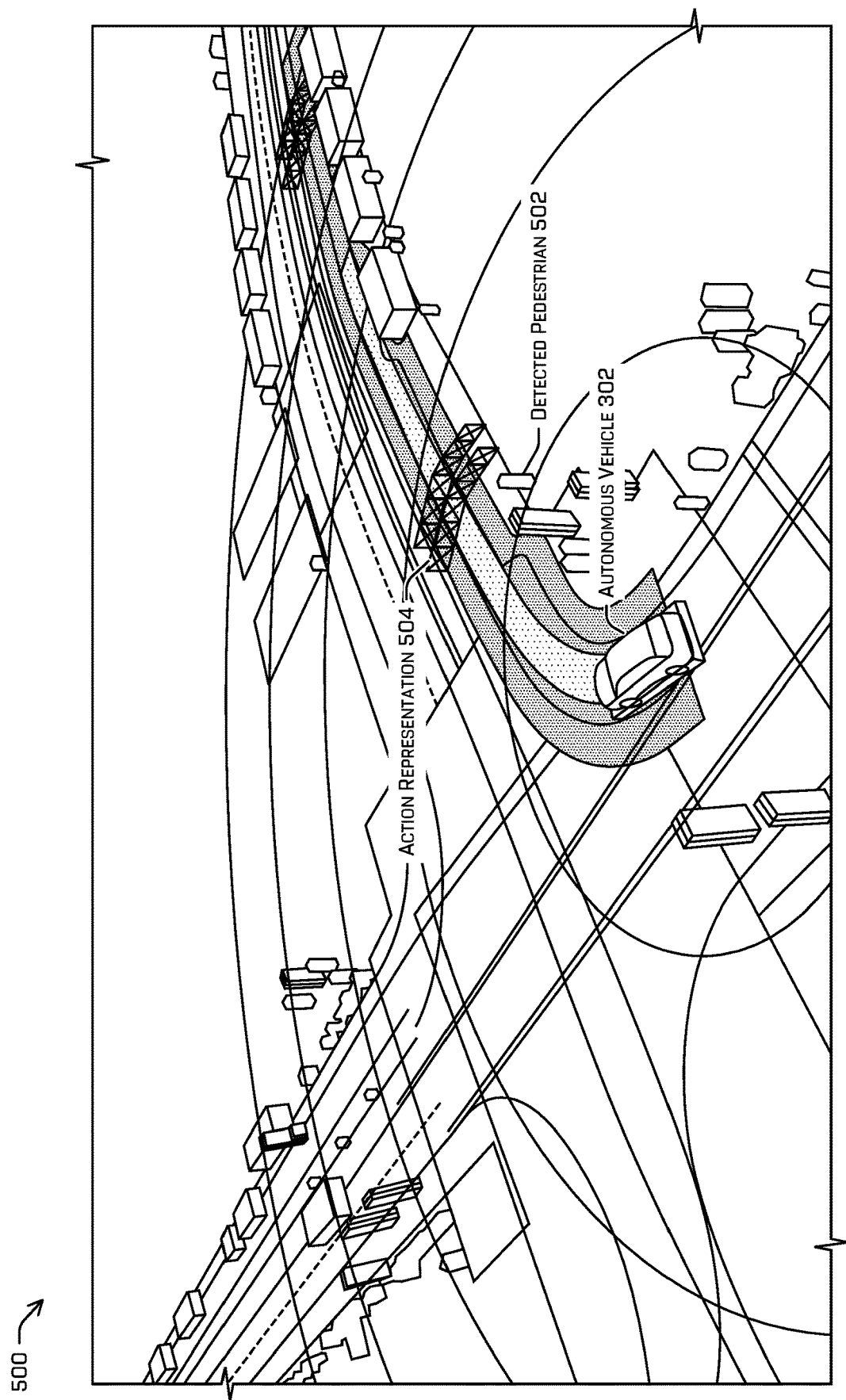

FIGS. 3-5 illustrate representations of sensor and/or perception data associated with operating an autonomous vehicle. FIG. 3 depicts a representation 300 of perception data determined by an autonomous vehicle 302 as it operates and no subcomponents have output a candidate action that causes the autonomous vehicle 302 to switch out of normative operation, meaning that any candidate actions that have been proposed by a subcomponent other than the normative trajectory generation subcomponent do not have a sufficient priority, confidence score, or the like to cause override a normative trajectory. For example, the autonomous vehicle may detect objects in the environment, such as the detected traffic light 304, based at least in part on sensor data, and may determine a drive corridor 306 based at least in part on sensor data, perception data, and/or a map. The trajectory generation subcomponent may generate a set of candidate trajectories based at least in part on the sensor data, perception data, and the drive corridor 306. For example, the candidate trajectories may be constrained to lie within the drive corridor 306. The trajectory selection component may select a trajectory from among the set of candidate trajectories that is associated with a lowest cost, which in the depicted example may result in controlling the autonomous vehicle 302 to maintain a speed and heading of the vehicle to go straight through the intersection.

FIG. 4 illustrates a representation 400 of perception data associated with a same scenario as FIG. 3 received at a time subsequent to the time depicted in FIG. 3. In the depicted scenario, a perception subcomponent may temporarily indicate that the detected traffic light 304 is red (e.g., due to air conditions or other interference) and/or traffic light planning subcomponent may indicate a candidate action requesting a stop due to a red light. The trajectory selection component may have selecting this candidate action for implementation since a candidate action based on a red light may have an increased priority and the trajectory selection component may have output a trajectory to the controller(s) to cause the vehicle to stop. This selected action, i.e., to stop the vehicle, is represented in FIG. 4 as action representation 402. Because the candidate action was only temporarily output by the traffic light planning subcomponent, the autonomous vehicle 302 may resume normative trajectory generation and selection, resulting in the autonomous vehicle 302 tapping the brakes briefly to stop and then resuming the previous speed. Ultimately, without the techniques discussed herein, nothing would be known about why the autonomous vehicle tapped on the brakes.

FIG. 5 depicts a representation 500 of perception data and a drive corridor associated with a different scenario where the autonomous vehicle 302 is executing a turn. In this scenario, the autonomous vehicle 302 may have detected a pedestrian (i.e., detected pedestrian 502) and a pedestrian subcomponent may have generated a candidate action indicating stopping at least by the position of the action representation 504 in the depiction. This may cause the autonomous vehicle 302 to briefly slow before accelerating again after the candidate action is no longer output by the subcomponent.

Example Processes

Figure 6:
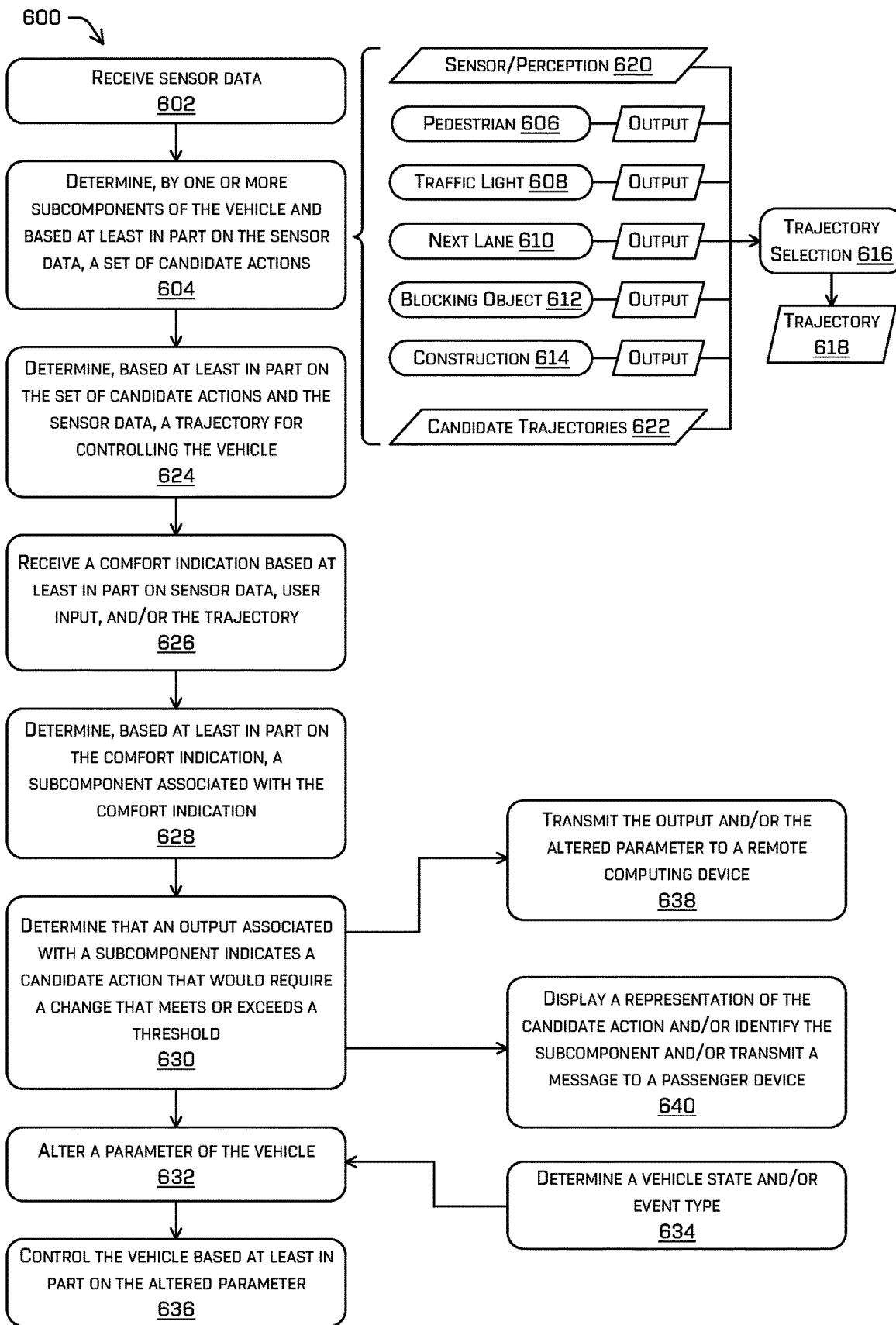
FIG. 6 illustrates a flow diagram of an example process for detecting an interruption to ride smoothness, detecting a component or subcomponent responsible for the interruption, and tuning an operation parameter of the vehicle to minimize the interruption and/or future interruptions.
Figure 7:
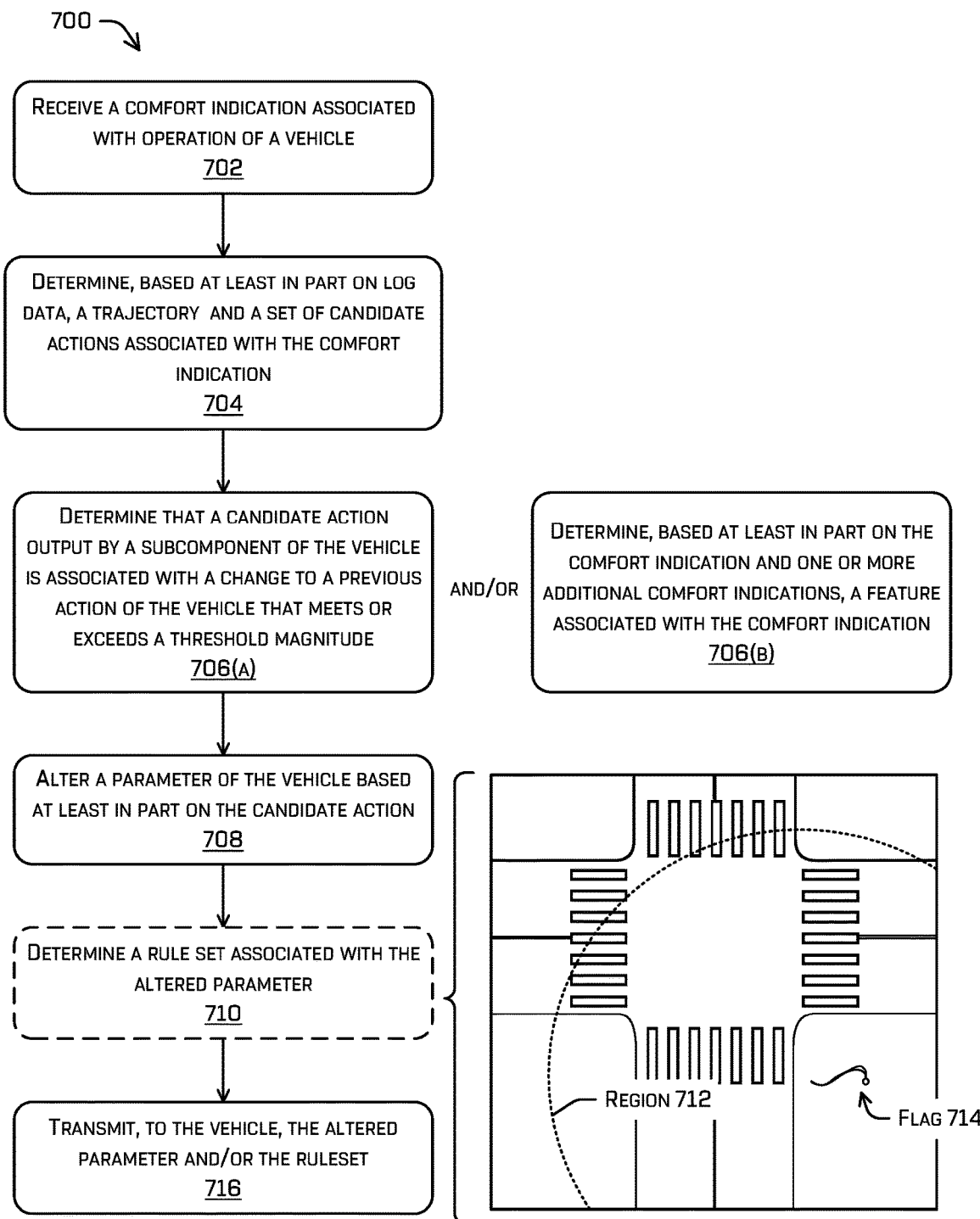
FIG. 7 illustrates a flow diagram of an example process for detecting an interruption to ride smoothness using log data received from a vehicle and determining an altered parameter for use by one or more vehicles.

FIGS. 6 and 7 illustrate flow diagrams of example process 600 and example process 700, respectively, for detecting an interruption to ride smoothness of an autonomous vehicle and tuning operation parameters associated with the autonomous vehicle to decrease interruption(s) to the ride smoothness. In some examples, example process 600 may be conducted by the comfort component during operation of an autonomous vehicle, whether by the autonomous vehicle itself and/or by a remote computing device. In an additional or alternate example process(es) 700 may be conducted based at least in part on log data received from a simulated vehicle or real-world vehicle and conducted at the remote computing device. In some examples, example process 600 and/or example process 700 may be conducted proactively to identify ride smoothness interruptions or responsive to receiving an indication that a ride smoothness interruption has occurred. For simplicity, the following examples discuss trajectory generation and selection, although the techniques may be applied to other systems, such as ride device action selection, emitter action selection, etc.

At operation 602, example process 600 may comprise receiving sensor data associated with a sensor type, according to any of the techniques discussed herein. For example, the sensor data may comprise LIDAR data, radar data, infrared image data, visual image data, sonar data, and/or the like.

At operation 604, example process 600 may comprise determining, by one or more subcomponents of a vehicle and based at least in part on the sensor data, a set of candidate actions, according to any of the techniques discussed herein. For example, operation 604 may be comprise determining perception data and providing the perception data to a subcomponent of the planning component. The subcomponent may comprise hardware and/or software and may include an ML model pipeline. The subcomponent may receive sensor and/or perception data and may determine a candidate action, which may include non-action (i.e., an indication to continue to generate and select trajectories using a normative trajectory generation and selection subcomponent) or may include a candidate action that differs from normative operation, such as slowing, stopping, or executing a maneuver (e.g., parking, emergency stop, emergency swerving, emergency lane change, lane change). In some examples, the candidate action may be associated with a value or the subcomponent may be configured to output a value instead of a candidate action. Values may include, for example, a confidence score generated by an ML model (e.g., a likelihood that a pedestrian or driver is paying attention to the vehicle, a likelihood a pedestrian is about to enter a roadway, a likelihood an object is occluded behind another object), an estimated distance to a nearest object, an estimated time until impact or an acceleration required to avoid impact, etc.

FIG. 4 depicts a few examples of potential subcomponents, although the depicted examples are nonlimiting. The vehicle may comprise less or (many) more subcomponents that may generate candidate actions and/or values used by an action selection component of the planning component to generate control signals for controlling operation of the vehicle. The depicted examples include:

- a pedestrian component 606 for determining candidate actions and/or values related to objects detected and classified as being pedestrians,
- a traffic light component 608 (shown with dashed lines, as it is the subject of an example given below) for determining candidate actions and/or values related to traffic lights/signage,
- a next lane component 610 for determining candidate actions and/or values related to object(s) occupying lanes next to the vehicle,
- a blocking object component 612 for determining whether a detected object is blocking a lane that the vehicle occupies and/or candidate actions and/or values related thereto, and
- a construction component 614 for detecting construction zones and/or determining candidate actions and/or values related thereto.

The outputs of the respective subcomponents may be provided to a trajectory selection component 616, which may generate a trajectory 618 based at least in part on any candidate actions received from the subcomponents, sensor and/or perception data 620, and/or candidate trajectory(ies) 622 generated by a trajectory generation component associated with nominal operation of the vehicle.

At operation 624, example process 600 may comprise determining, based at least in part on the set of candidate actions and the sensor data, a trajectory for controlling the vehicle, according to any of the techniques discussed herein. For example, a candidate action and/or value associated therewith may be used as part of a cost determination associated with a candidate trajectory and the trajectory may be selected based at least in part on a cost associated with the trajectory.

At operation 626, example process 600 may comprise receiving a comfort indication based at least in part on sensor data, user input, and/or the trajectory, according to any of the techniques discussed herein. For example, the vehicle may determine, based at least in part on sensor data, that an acceleration and/or jerk associated with the sensor data meets or exceeds an acceleration threshold and/or jerk threshold. There may be one or more acceleration thresholds and/or jerk thresholds. For example, first threshold may be a heuristic, static threshold for high-acceleration and high-jerk events and a second threshold may be a dynamic threshold set by the vehicle. In the latter example, the vehicle may determine a dynamic acceleration threshold and/or a dynamic jerk threshold based at least in part on determining an estimated acceleration or an estimated jerk associated with a candidate action. If the estimated acceleration or the estimated jerk violates static threshold, a comfort indication may be generated or a different candidate trajectory may be selected. In an instance when the candidate trajectory is selected for implementation by the vehicle, the vehicle may set the estimated acceleration and/or the estimated jerk as the dynamic threshold(s). Upon implementing the candidate trajectory to control motion of the vehicle, additional sensor data may be received in association with such control. A measured acceleration and/or a measured jerk may be determined based at least in part on the additional sensor data. If the measured acceleration and/or the measured jerk meet or exceed the dynamic threshold(s) (or exceed the dynamic threshold(s) by a pre-set amount), the vehicle may generate a comfort indication. In other words, if the trajectory caused an acceleration or jerk that was greater than expected, a comfort indication may be generated.

In an additional or alternate example, some interruptions to ride smoothness may not result in a jerk that meets or exceeds the jerk threshold but may interrupt ride smoothness anyway. In such an example, user input (e.g., a passenger) may be used to indicate an interruption to ride smoothness or a duration of a maintenance of the trajectory may be compared to a minimum time period. For example, if the trajectory isn't maintained for longer than the time period and a maneuver isn't being executed that includes a changing trajectory, the comfort component may generate a comfort indication. In some examples, user input may be provided at an input/output device of the vehicle or at a remote computing device, such as be a teleoperator or by a developer that is reviewing log data. In yet another example, user input may be received via a message received from a device associated with a passenger of the vehicle. For example, an application running on the passenger device may present a user interface (e.g., graphical, auditory, otherwise) that presents an option to provide feedback about the smoothness of the ride or to ask what caused an interruption to smoothness. Such an indication and/or any data associated therewith, such as a time at which the user interface element was activated or the like may be used to generate a comfort indication, which may be transmitted directly to the vehicle and/or to the remote computing device.

At operation 628, example process 600 may comprise determining, based at least in part on the comfort indication, a subcomponent associated with the comfort indication, according to any of the techniques discussed herein. If the exact computational cycle associated with the comfort indication isn't known, such as when user input generates the comfort indication or sensor data has a slight lag, comfort component may determine a set of computational cycles associated with a time associated with the comfort indication. The comfort component may determine whether a subcomponent output a candidate action that was implemented by the vehicle during that time range and/or whether a subcomponent output a candidate action for a duration of time less than a threshold time period.

At operation 630, example process 600 may comprise determining that an output associated with a subcomponent that would require a change to a previous trajectory having a magnitude that meets or exceeds a threshold magnitude, according to any of the techniques discussed herein. This may include determining that an absolute value of an acceleration or jerk required to implement a candidate action indicated by the output meets or exceeds a threshold acceleration or threshold jerk, determining that a steering angle or steering rate deviates from a steering angle or steering rate by more than a threshold angle or threshold angular rate, and/or the like. Additionally or alternatively operation 630 may, more simply, determine that the trajectory resulting from the candidate action was momentary, i.e., output for a time period that is less than a threshold duration of time.

At operation 632, example process 600 may comprise altering a parameter of the vehicle, based at least in part on candidate action and/or the subcomponent identified, to obtain an altered parameter configured to decrease an amount that output of the subcomponent influences trajectories generated by the vehicle, according to any of the techniques discussed herein. For example, the parameter may be a parameter of the perception component, planning component, controller(s), and/or drive components of the vehicle. In some examples, the comfort tuning component may not modify the parameter outside of upper and/or lower bounds on the parameter that may be predefined by other techniques to ensure the safety and efficacy of the operation of the vehicle. The comfort component may determine a duration of time, a geographical region, or other feature associated with the altered parameter, such that the vehicle uses the altered parameter for the duration of time or for any time the vehicle is located in the geographical region. In some examples, a remote computing device may determine the duration of time, geographical region, other feature, and/or other conditions to include in a rule set for implementing the altered parameter. For example, feature(s) associated with a comfort indication and/or an altered parameter may include a geographical region, an environmental feature (e.g., a weather condition, the presence of a number or type of objects, a roadway layout), an object type, an object track (e.g., erratic object track), time-related features (e.g., time of day, day of the week, time of year), scenario, etc. A scenario may define a number of various attributes as a scenario pattern. For example, a scenario pattern may include an object type, an environmental feature such as the existence of traffic signage or a type of junction, a vehicle state (e.g., a speed of the vehicle, an operation being executed by the vehicle, a condition of the vehicle system(s)), and/or a relation of any such features to the vehicle (e.g., a distance of an object or junction from the vehicle).

Altering the parameter may comprise at least one of altering a weight associated with the output of the subcomponent in determining a cost associated with trajectories associated therewith, a minimum duration of time (or number of computation cycles) required for a candidate action to be sequentially output by the subcomponent before the action selection component can select the candidate action for implementation, a maximum permitted acceleration and/or maximum jerk associated with a trajectory generated by the trajectory generation component, a maximum permitted acceleration or jerk associated with transitioning from a prior trajectory to a current trajectory, a gain of the drive system, a dampening coefficient of the drive system and/or suspension, a cost and/or cost function, a parameter of the trajectory generation component (e.g., search expansion coefficient, canonical trajectory characteristics, weights), etc.

In at least one example, altering the parameter may comprise tuning a cost function that determines a cost associated with a candidate trajectory, such that the cost function weights comfort metrics more heavily, resulting in the planning component being more likely to select a trajectory that is less likely to result in another comfort indication being generated. The costs of different candidate trajectories may be used by the planning component to select a trajectory for implementation by the vehicle. The planning component may select a candidate trajectory for implementation by the vehicle based at least in part on determining that the candidate trajectory is associated with a cost that is lowest among the costs associated with the set of candidate trajectories generated by the vehicle. Altering parameter(s) of the cost function may include increasing a weight associated with a sub-cost that is associated with ride comfort; modifying a target optimization metric to increasingly weight comfort or to prioritize weight (e.g., after generating the candidate trajectories and preliminary costs, optimize over costs associated with comfort and safety); altering the cost function such that candidate trajectories associated with lower rates of acceleration, jerk, etc. are lowered further; altering the cost function to decrease costs of trajectories that reduce a likelihood of receiving an additional comfort indication, and/or the like.

In some examples, altering the parameter may additionally or alternatively be based at least in part on determining (at operation 634) a vehicle state and/or an event type associated with the comfort indication and/or the altered parameter. For example, the vehicle state may comprise an indication of an extent of wear to one or more components of the vehicle (e.g., suspension, brake pads, steering rack, tires, sensors); a hardware identifier that identifies a make, model, type, or version of any component of the vehicle; a calibration parameter; and/or a drift identifying an average difference between estimated motion caused by a candidate trajectory and measured motion caused by the candidate trajectory upon implementation by the vehicle (e.g., a difference in longitudinal and/or lateral position, velocity, acceleration, etc., a steering difference). The event type may be determined based at least in part on a task output by the subcomponent identified at operation 628, sensor data, and/or the vehicle state. For example, the event type may be associated with a detected scenario, such as an indication, determined based at least in part on sensor data, that the vehicle is climbing a hill and making a lane change with a pedestrian crossing a crosswalk 20 meters ahead of the vehicle. The event type may include less information than the scenario and may be associated with the comfort indication and/or the altered parameter. To give a limited example, the event type may indicate that the vehicle is entering a construction zone or a difficult roadway layout type and/or environmental conditions and/or objects; numerous dynamic objects have been detected; a difficult object has been detected, such as detecting a traffic light color when the air is smoky and/or smoggy, predicting a pedestrian's future position when it's night time and the pedestrian is wearing all black clothing; etc.

Altering the parameter may be based at least in part on the event type and/or vehicle state. For example, wear on the steering rack, drift, etc. may affect how the altered parameter affects trajectories implemented by the vehicle and different event types may be associated with different upper bounds and/or lower bounds for modifications to the parameter. In other words, these upper and lower bounds and/or which parameter(s) are eligible for alteration may be different depending on the type of event detected. For example, an event type of associated with emergency braking may have a smaller interval between the upper bound and the lower bound so that emergency braking continues to be effective, whereas an event type associated with a lane change may have a greater interval between the upper bound and the lower bound.

In an additional or alternate example, the alteration may be different for parameters affecting lateral versus longitudinal motion based at least in part on the event type. For example, operation 632 may comprise determining whether to tune parameter(s) affecting lateral motion, longitudinal motion, or both lateral motion and longitudinal motion according to different tuning. Operation 632 may modify a first parameter associated with lateral motion (i.e., a lateral parameter) differently than a second parameter associated with longitudinal motion. For example, for a lane changing event, parameter(s) affecting lateral motion may be changed more than parameter(s) affecting longitudinal motion.

At operation 636, example process 600 may comprise controlling the vehicle based at least in part on the altered parameter, according to any of the techniques discussed herein. For example, operation 636 may comprise generating trajectories, selecting candidate action(s), determining cost(s), and/or selecting trajectories differently based at least in part on the altered parameter.

Operation 636 may additionally or alternatively comprise activating and/or modifying a dampening coefficient associated with the suspension and/or activating a passenger restraint, such as a seatbelt, in anticipation of receiving an additional comfort indication and/or before implementing a trajectory that is associated with an estimated acceleration and/or estimated jerk that meets or exceeds threshold(s) or that is within an offset of the threshold(s) (e.g., within 0.2

$$\frac{m}{s^2}$$

of an acceleration threshold). The threshold(s) may be static or dynamic threshold(s) as discussed above and may be acceleration and/or jerk thresholds.

Additionally or alternatively, operation 636 may occur based at least in part on determining that an assertiveness score associated with an entity meets or exceeds a threshold (see U.S. patent application Ser. No. 17/006,679, filed Aug. 28, 2020) on detecting that a scenario associated with operation of the vehicle is within at least one of the geographical region, duration of time, or time of day; the vehicle has detected an object associated with the object type; or the scenario matches a scenario pattern specifying at least one of an arrangement of environmental features, a vehicle state, the object type, or object track. For example, upon such a detection, the vehicle may substitute a parameter used for nominal operation with the altered parameter.

Example process 600 may additionally or alternatively comprise operation(s) 638 and/or 640.

At operation 638, example process 600 may comprise transmitting the output, including the candidate action, and/or the altered parameter to a remote computing device, according to any of the techniques discussed herein. Operation 638 may additionally or alternatively comprise transmitting relevant log data to the remote computing device and, in some instances, the remote computing device may confirm or modify the altered parameter or may determine the altered parameter instead of the vehicle. In some examples, the remote computing device may determine a rule set associated with the altered parameter defining conditions that, upon positive detection by the vehicle, cause the vehicle to substitute the parameter for an altered parameter.

At operation 640, example process 600 may comprise displaying a representation of the candidate action and/or identifying the subcomponent, according to any of the techniques discussed herein. For example, operation 640 may occur while the vehicle is in a development mode, during operation of the vehicle, while conveying a passenger, during a simulation of the vehicle, or during review of log data associated with the vehicle at a remote computing device. The vehicle may generate a representation, such as the representations 300, 400, or 500, and cause such representations to be presented via a display, such as a display in the vehicle or a display at a remote computing device. Additionally or alternatively, the representation may be transmitted to a passenger device. The representation may include an indication of the subcomponent that caused or contributed the interruption as identified by operations 628 and 630. The subcomponent indication may be visually or audibly associated with the action representation 402 or 504, respectively. In at least one example, the vehicle or the remote computing device may transmit a message to a passenger device indicating what caused an interruption to ride smoothness. This may be in response to a passenger inquiry generated via a user interface of an application executing on the passenger device or at an interactive system of the vehicle, or, in another example, transmitting the message may be proactive, so as to reassure passengers. For example, the message may indicate that the vehicle briefly pumped the brakes because the vehicle detected a pedestrian down the road and thought the pedestrian would enter the roadway but didn't, environmental conditions interfered with correctly detecting a traffic light color and the vehicle took a more conservative action to ensure that the vehicle wasn't violating the laws and that the passengers would be safe, etc.

Turning to FIG. 7, example process 700 may be implemented at a remote computing device in at least one example although the vehicle may execute at least part of example process 700 in some examples.

At operation 702, example process 700 may comprise receiving a comfort indication associated with operation of a vehicle, according to any of the techniques discussed herein. The comfort indication may indicate an interruption to ride smoothness and may be generated according to any of the techniques discussed herein.

At operation 704, example process 700 may comprise determining, based at least in part on log data received from the vehicle, a trajectory associated with the comfort indication and a set of candidate actions upon which the vehicle based generation of the trajectory or a set of candidate actions that were output by the one or more subcomponents during a time range associated with the trajectory, according to any of the techniques discussed herein. In some examples, determining the trajectory associated with the comfort indication may comprise searching the log data for one or more trajectories associated with an acceleration or jerk that meets or exceeds a threshold acceleration or jerk or a trajectory that was implemented for less than a threshold time period. Determining the trajectory associated with the comfort indication may additionally or alternatively comprise receiving the comfort indication from a passenger device and determining a trajectory that is likely associated with the comfort indication. This may include determining trajectory(ies) associated with sensor data that indicates an acceleration and/or jerk that meets or exceeds a running average, a threshold, or the like.

At operation 706(a), example process 700 may comprise determining that a candidate action output by a subcomponent of the vehicle is associated with a change to a previous action of the vehicle that meets or exceeds a threshold magnitude, according to any of the techniques discussed herein.

Additionally or alternatively, example process 700 may comprise operation 706(b). At operation 706(b), example process 700 may comprise determining, based at least in part on the comfort indication and one or more additional comfort indications, a feature associated with the comfort indication. The additional comfort indications may be received from the same vehicle and/or from different vehicles. The feature may identify an output of a subcomponent of the vehicle that at least contributed to the comfort indication. Additionally or alternatively the feature may identify a geographical region, scenario, time, event type, and/or object type, etc. associated with the comfort indication. Determining the feature may be based at least in part on data indicated by the comfort indication, log data, and/or sensor data. A scenario may define a number of various attributes as a scenario pattern. For example, a scenario pattern may include an object type, an environmental feature such as the existence of traffic signage or a type of junction, a vehicle state (e.g., a speed of the vehicle, an operation being executed by the vehicle, a condition of the vehicle system(s)), and/or a relation of any such features to the vehicle (e.g., a distance of an object or junction from the vehicle).

In some examples, the feature may additionally or alternatively comprise data about any relationships of the comfort indication to other comfort indications. For example, example process 700 may comprise clustering the comfort indications according to all or any of the data identified by the features associated therewith. In other words, clustering may be conducted over geographic regions identified by the features, all data identified by the features, over geographic regions and time, over objects detected at or near the same time as the comfort indication was generated, over scenario patterns, etc. The clustering algorithm may include k-means, density-based spatial clustering of applications with noise (DBSCAN), or the like. In an instance where two comfort indications are clustered into a same cluster, the features of the respective comfort indications may identify the cluster, the comfort indications associated with the cluster, and/or a common feature, such as a representative feature determined in association with the cluster that represents most or many of the comfort indications within the cluster. For example, the representative feature may be a location, a geographical region, a time, time range, object type, scenario, and/or the like. At least as regards geographical regions or time, Additionally or alternatively, a relationship may be determined between two comfort indications by determining that the comfort indications have a feature in common, such as a same object type being identified in the environment associated with the vehicle at or near the time the comfort indication was generated. In some examples, determining that the comfort indications have a feature in common may be based at least in part on determining a similarity between the features of the comfort indications. For example, the Kuhn-Munkres or Jaccard algorithm may be used to determine a similarity score between two scenarios identified by the features. If the similarity score meets or exceeds a threshold, the comfort indications may be associated with each other.

At operation 708, example process 700 may comprise altering a parameter of the vehicle based at least in part on the candidate action, according to any of the techniques discussed herein. Operation 708 may comprise altering longitudinal parameter(s) and/or lateral parameter(s) together (using total acceleration, for example), separately, and/or differently, as discussed above.

At operation 710, example process 700 may comprise determining a rule set associated with the altered parameter, according to any of the techniques discussed herein. In some examples, the altered parameter may be a permanent (until a next update) change to the parameter, in which case operation 710 may be skipped (dashed lines to indicate that this operation 710 may be skipped in such an instance). However, in other examples, a rule set may be determined based at least in part on auxiliary data associated with the comfort indication, the subcomponent, and/or the candidate action. The rule set may indicate conditions for implementing the altered parameter. Until the conditions are met, the vehicle may use the unaltered parameter and, upon satisfaction of the conditions, the vehicle may use the altered parameter for trajectory generation and/or selection. For example, the rule set may specify a weather state, geographical region, time of day, date(s), time period, detected object type, or the like that must be detected to implement the altered parameter. Inversely, the altered parameter may be used for nominal use and the rule set may be used to revert to the previous parameter. In some examples, a common feature, as indicated by a relationship between comfort indications as determined above, may be used as part of determining the ruleset. For example, the representative feature may be used as part of the ruleset, which may include, for example, a scenario indicated as being a representative feature for a cluster, a geographic region associated with a cluster, a geographic region associated with a density of comfort indications that meets or exceeds a threshold, etc.

For example, FIG. 7 depicts a region 712 that was generated based at least in part on a interruption that was traced to having been associated with a misclassification of a flag 714. Any time the vehicle determines, based at least in part on sensor data, that the vehicle is within the region 712 (and/or that the weather is windy, if the rule set specifies such a weather state), the vehicle may use an altered parameter for trajectory generation and/or selection.

Operation 710 may additionally or alternatively comprise presenting a suggested rule set via a remote computing device for confirmation by user input. For example, operation 710 may present a cluster of comfort indications and a representative feature associated with the cluster. The representative feature may be affirmed, modified, or deleted based on user input. In yet another example, operation 710 may comprise presenting a polygon or other shape overlaid over a representation of a geographic region, where the polygon represents a geographic region that is to be included in the rule set.

In at least one example, the ruleset may cause the vehicle to pre-activate the suspension, passenger restraint(s), or otherwise absorb shock or prepare passengers for a rough section of roadway, a pothole, a steep climb, a steep curb, or a maneuver that needs to be executed quickly, such as turning through a very busy and large intersection that can only be crossed by turning in front of oncoming traffic.

At operation 716, example process 700 may comprise transmitting, to the vehicle (and/or one or more additional vehicles) the altered parameter and instructions to replace the parameter with the altered parameter, according to any of the techniques discussed herein. Additionally or alternatively, operation 716 may comprise transmitting the rule set to the vehicle (and/or one or more additional vehicles), so that the vehicle conditionally uses the altered parameter. Operation 716 may additionally or alternatively comprise transmitting a reason for an interruption to ride smoothness to a passenger device.

Example Clauses

A. A vehicle comprising: one or more processors; and a memory storing processor-executable instructions that, when executed by the one or more processors, cause the vehicle to perform operations comprising: receiving sensor data; determining, by one or more subcomponents of the vehicle and based at least in part on the sensor data, a set of candidate actions; determining, based at least in part on the set of candidate actions and the sensor data, a trajectory for controlling the vehicle; receiving a comfort indication based at least in part on at least one of the sensor data, user input, or the trajectory, wherein the comfort indication is associated with an interruption to ride smoothness associated with operation of the vehicle; determining, based at least in part on the comfort indication, that an output associated with a subcomponent of the one or more subcomponents indicates a candidate action that, upon implementation by the vehicle, would result in an acceleration or deceleration that meets or exceeds a threshold; altering, based at least in part on the candidate action, a parameter of at least one of a planning component or a drive system of the vehicle to obtain an altered parameter, the altered parameter being configured to decrease an amount that output of the subcomponent influences trajectories generated by the vehicle; and controlling the vehicle based at least in part on the altered parameter.

B. The vehicle of paragraph A, wherein the interruption to ride smoothness comprises at least one of a momentary deceleration, a momentary acceleration, momentarily initiating a turn or momentarily changing a steering angle, or momentary activation of an emitter of the vehicle.

C. The vehicle of either paragraph A or B, wherein the parameter comprises at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

D. The vehicle of any one of paragraphs A-C, wherein the operations further comprise: determining, based at least in part on the sensor data and a task associated with the subcomponent, an event type; and determining, based at least in part on the event type, to alter longitudinal tolerances or lateral tolerances associated with ride comfort; wherein altering the parameter comprises modifying the planning component or the drive system to at least one of: decrease (A) at least one of longitudinal acceleration or longitudinal jerk, or (B) at least one of lateral acceleration or lateral jerk associated with a candidate trajectory generated by the planning component, or decrease a cost determined in association with the candidate trajectory according to reduction of (A) at least one of longitudinal acceleration or longitudinal jerk, or (B) at least one of lateral acceleration or lateral jerk.

E. The vehicle of any one of paragraphs A-D, where the operations further comprise at least one of: activating suspension of the vehicle or modifying a dampening coefficient associated with the suspension in anticipation of receiving an additional comfort indication, or activating a passenger restraint in anticipation of receiving the additional comfort indication.

F. The vehicle of any one of paragraphs A-E, wherein: the operations further comprise: determining, based at least in part on the sensor data, a jerk associated with operating the vehicle according to the trajectory; or determining that the subcomponent output the candidate action for a duration of time that is less than a threshold duration of time; and receiving the comfort indication is based at least in part on: determining that the jerk meets or exceeds a jerk threshold, or determining that the subcomponent output the candidate action for the duration of time that is less than the threshold duration of time.

G. A method comprising: receiving sensor data; determining, by one or more subcomponents of the vehicle and based at least in part on the sensor data, a set of candidate actions; determining, based at least in part on the set of candidate actions and the sensor data, a trajectory for controlling the vehicle; receiving a comfort indication, wherein the comfort indication is associated with an interruption to ride smoothness associated with operation of the vehicle; determining, based at least in part on the comfort indication, that an output associated with a subcomponent of the one or more subcomponents indicates a candidate action that, upon implementation by the vehicle, would result in an acceleration or deceleration that meets or exceeds a threshold; altering, based at least in part on the candidate action, a parameter of at least one of a planning component or a drive system of the vehicle to obtain an altered parameter; and controlling the vehicle based at least in part on the altered parameter.

H. The method of paragraph G, wherein the parameter comprises at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

I. The method of either paragraph G or H, further comprising: activating suspension of the vehicle or modifying a dampening coefficient associated with the suspension in anticipation of receiving an additional comfort indication, or activating a passenger restraint in anticipation of receiving the additional comfort indication.

J. The method of any one of paragraphs G-I, further comprising: receiving an indication that the vehicle is operating in a developer mode; and at least one of: displaying, via a display of the vehicle, a representation of the vehicle, an identification of the subcomponent, and a representation of the candidate action or the trajectory generated based at least in part on the candidate action; or transmitting a message to a computing device associated with a passenger, wherein the message comprises an indication of at least one of a task associated with the subcomponent or an object in or state of an environment associated with the vehicle that caused the comfort indication.

K. The method of any one of paragraphs G-J, further comprising: receiving new sensor data; determining, based at least in part on the new sensor data and the altered parameter, candidate trajectories based at least in part on the new sensor data; determining, based at least in part on the comfort indication, a cost associated with a first trajectory; and controlling the vehicle using the first trajectory based at least in part on the cost associated with the first trajectory.

L. The method of paragraph K, wherein: determining the cost is based at least in part on a cost function that determines the cost associated with the trajectory based at least in part on the sensor data; and altering the parameter comprises modifying one or more parameters of the cost function to decrease costs of trajectories that reduce a likelihood of receiving an additional comfort indication or are associated with a jerk, acceleration, gain, or dampening coefficient that satisfies a respective threshold.

M. The method of any one of paragraphs G-L, further comprising: determining, based at least in part on the sensor data and a task associated with the subcomponent, an event type; and determining, based at least in part on the event type, to alter longitudinal tolerances or lateral tolerances associated with ride comfort; wherein altering the parameter comprises modifying the planning component or the drive system to at least one of: decrease (A) at least one of longitudinal acceleration or longitudinal jerk, or (B) at least one of lateral acceleration or lateral jerk associated with a candidate trajectory generated by the planning component, or decrease a cost determined in association with the candidate trajectory according to reduction of (A) at least one of longitudinal acceleration or longitudinal jerk, or (B) at least one of lateral acceleration or lateral jerk.

N. A non-transitory computer-readable medium storing processor-executable instructions that, when executed by one or more processors, causes the one or more processors to perform operations comprising: receiving sensor data; determining, by one or more subcomponents of the vehicle and based at least in part on the sensor data, a set of candidate actions; determining, based at least in part on the set of candidate actions and the sensor data, a trajectory for controlling the vehicle; receiving a comfort indication, wherein the comfort indication is associated with an interruption to ride smoothness associated with operation of the vehicle; determining, based at least in part on the comfort indication, that an output associated with a subcomponent of the one or more subcomponents indicates a candidate action that, upon implementation by the vehicle, would or did result in an acceleration or deceleration that meets or exceeds a threshold; altering, based at least in part on the candidate action, a parameter of a trajectory generation and selection system of the vehicle to obtain an altered parameter; and controlling the vehicle based at least in part on the altered parameter.

O. The non-transitory computer-readable medium of paragraph N, wherein the operations further comprise: activating suspension of the vehicle or modifying a dampening coefficient associated with the suspension in anticipation of receiving an additional comfort indication, or activating a passenger restraint in anticipation of receiving the additional comfort indication.

P. The non-transitory computer-readable medium of either paragraph N or O, wherein the operations further comprise at least one of: displaying, via a display of the vehicle, a representation of the vehicle, an identification of the subcomponent, and a representation of the candidate action or the trajectory generated based at least in part on the candidate action; or transmitting a message to a computing device associated with a passenger, wherein the message comprises an indication of at least one of a task associated with the subcomponent or an object in or state of an environment associated with the vehicle that caused the comfort indication.

Q. The non-transitory computer-readable medium of any one of paragraphs N-P, wherein the operations further comprise: receiving new sensor data; determining, based at least in part on the new sensor data and the altered parameter, a candidate trajectory based at least in part on the new sensor data; and controlling the vehicle using the first trajectory based at least in part on determining that a cost associated with the first trajectory is less than at least one of a cost threshold or a second cost associated with a second trajectory.

R. The non-transitory computer-readable medium of paragraph Q, wherein altering the parameter comprises modifying one or more parameters of a cost function that determines a cost associated with a candidate trajectory, wherein modifying the one or more parameters comprises determining an updated one or more parameters to decrease at least one of a cost associated with one or more ride comfort metrics associated with the candidate trajectory or a total cost associated with the candidate trajectory, such that the total cost decreases as ride smoothness increases.

S. The non-transitory computer-readable medium of paragraph R, wherein a ride comfort metric comprises and ride smoothness is based at least in part on at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

T. The non-transitory computer-readable medium of any one of paragraphs N-S, wherein the operations further comprise: determining, based at least in part on the sensor data and a task associated with the subcomponent, an event type; and determining, based at least in part on the event type, to alter longitudinal tolerances or lateral tolerances associated with ride comfort; wherein altering the parameter comprises modifying the planning component or the drive system to decrease (A) at least one of longitudinal acceleration or longitudinal jerk, or (B) at least one of lateral acceleration or lateral jerk.

U. The vehicle of any one of paragraphs A-T, wherein the operations further comprise: transmitting the altered parameter to a remote computing device; and receiving, from the remote computing device, at least one of a duration of time, a geographical region associated with the altered parameter, or an instruction to control the vehicle using the altered parameter based at least in part on detecting that a location of the vehicle is within the geographical region.

V. The vehicle of paragraph A, wherein: the operations further comprise: determining, based at least in part on the trajectory, at least one of an estimated acceleration or an estimated jerk; and determining, based at least in part on the sensor data or additional sensor data, at least one of a measured acceleration or a measured jerk; and receiving the comfort indication based at least in part on sensor data comprises detecting the comfort indication by determining that at least one of a first difference between the estimated acceleration and the measured acceleration meets or exceeds a first threshold difference or a second difference between the estimated jerk and the measured jerk meets or exceeds a second threshold difference.

W. The vehicle of any one of paragraphs A-V, wherein: the operations further comprise determining a vehicle state based at least in part on the sensor data; altering the parameter is further based at least in part on the vehicle state; and the vehicle state comprises at least one of: an indication of an extent of wear to one or more components of the vehicle; a hardware identifier that identifies a make, model, type, or version of a sensor, the drive system, the planning component, the subcomponent, the one or more processors, or the memory; a calibration parameter associated with the sensor, the drive system, the planning component, the subcomponent, the one or more processors, or the memory; or a drift identifying an average difference between estimated motion caused by a candidate trajectory and measured motion caused by the candidate trajectory upon implementation by the vehicle.

X. The vehicle of any one of paragraphs A-W, wherein the operations further comprise: transmitting the altered parameter to a remote computing device; and receiving, from the remote computing device, at least one of a duration of time, a geographical region associated with the altered parameter, or an instruction to control the vehicle using the altered parameter based at least in part on detecting that a location of the vehicle is within the geographical region.

Y. The method of paragraph K, wherein: determining the cost is based at least in part on a set of weights associated with a set of variables determined based at least in part on the new sensor data; a first variable of the set of variables and a first weight are associated with ride comfort, the first variable being based at least in part on the new sensor data and the comfort indication; and altering the parameter comprises modifying the first weight such that the first variable is weighted more heavily.

Z. The method of any one of paragraphs K-Y, wherein: determining the cost is based at least in part on a cost function that determines the cost associated with the trajectory based at least in part on the sensor data; and altering the parameter comprises modifying one or more parameters of the cost function to decrease costs of trajectories that at least one of result in fewer or no comfort indications or are associated with a jerk, acceleration, gain, or dampening coefficient that satisfies a respective threshold.

AA. A method comprising: receiving a comfort indication associated with operation of a vehicle, wherein the comfort indication is associated with an interruption to ride smoothness; determining, based at least in part on log data received from the vehicle, a trajectory associated with the comfort indication and a set of candidate actions upon which the vehicle based generation of the trajectory; determining, based at least in part on the set of candidate actions, that a candidate action output by a subcomponent of the vehicle is associated with a change to a previous action of the vehicle that meets or exceeds a threshold magnitude; altering, based at least in part on the comfort indication and the candidate action, a parameter of at least one of the subcomponent, a planning component, or a drive system of the vehicle to obtain an altered parameter, the altered parameter being configured to decrease an amount that output of the subcomponent influences trajectories generated by the vehicle; and transmitting, to the vehicle, the altered parameter and instructions to replace the parameter with the altered parameter.

AB. The method of paragraph AA, further comprising determining, based at least in part on at least one of the log data or additional log data received from one or more additional vehicles, at least one of a geographical region, an environmental feature, an object type, duration of time, or time of day associated with the altered parameter; wherein the instructions further instruct the vehicle to replace the parameter with the altered parameter based at least in part on detecting that: a scenario associated with operation of the vehicle is within at least one of the geographical region, duration of time, or time of day; the vehicle has detected an object associated with the object type; or the scenario matches a scenario pattern specifying at least one of an arrangement of environmental features, a vehicle state, the object type, or object track.

AC. The method of paragraph AB, further comprising: receiving one or more additional comfort indications; and determining that the comfort indication and the one or more additional comfort indications are associated based at least in part on at least one of: clustering the comfort indication and the additional comfort indications and determining that the comfort indication and the one or more additional comfort indications are in a same cluster, determining whether a frequency of the comfort indication and the one or more additional comfort indications within a geographical area meets or exceeds a density threshold, determining that the comfort indication and the one or more additional comfort indications are associated with a same feature, or determining that a similarity between the comfort indication and the one or more additional comfort indications meets or exceeds a similarity threshold.

AD. The method of any one of paragraphs AA-AC, wherein determining that the candidate action is associated with a change to a previous action of the vehicle that meets or exceeds the threshold magnitude comprises determining that an acceleration or jerk required to implement the candidate action meets or exceeds an acceleration threshold or jerk threshold, or determining that a steering angle or steering rate deviates from a steering angle or steering rate by more than a threshold angle or threshold angular rate.

AE. The method of any one of paragraphs AA-AD, wherein altering the parameter comprises modifying: a cost function for determining a total cost associated with a candidate trajectory determined by the planning component to decrease a number of comfort indications generated in association with the vehicle; a minimum duration of time associated with the subcomponent output before the subcomponent output is implemented; a maximum acceleration; a maximum jerk; a gain of the drive system; a first dampening coefficient of the drive system; or a second dampening coefficient of a suspension of the vehicle.

AF. The method of any one of paragraphs AA-AE, further comprising: determining, based at least in part on at least one of the log data or the candidate action output by the subcomponent, an event type associated with the comfort indication; determining, based at least in part on the event type, to alter at least one of a longitudinal parameter or a lateral parameter associated with ride comfort; and at least one of: determining a first modification to the longitudinal parameter to reduce at least one of a longitudinal acceleration or longitudinal jerk associated with candidate trajectories generated by the vehicle, or determining a second modification to the lateral parameter to reduce at least one of a lateral acceleration or lateral jerk associated with the candidate trajectories generated by the vehicle, wherein the first modification is different than the second modification.

AG. A system comprising: one or more processors; and a memory storing processor-executable instructions that, when executed by the one or more processors, cause the system to perform operations comprising: receiving a comfort indication associated with operation of a vehicle, wherein the comfort indication is associated with an interruption to ride smoothness; determining, based at least in part on log data associated with operation of the vehicle, a trajectory associated with the comfort indication; determining, based at least in part on the comfort indication and one or more additional comfort indications received from at least one of the vehicle or another vehicle, a feature associated with the comfort indication, wherein the feature identifies an output of a subcomponent of the vehicle that at least contributed to the comfort indication and at least one of a geographical region, scenario, time, or object type common to the comfort indication and the one or more additional comfort indications; altering, based at least in part on the comfort indication and the output of the subcomponent, a parameter of at least one of the subcomponent, a planning component, or a drive system of the vehicle to obtain an altered parameter; and transmitting, to the vehicle, the altered parameter and instructions to replace the parameter with the altered parameter based at least in part on detecting the feature.

AH. The system of paragraph AG, wherein: the operations further comprise determining, based at least in part on at least one of the log data or additional log data received from one or more additional vehicles, at least one of the geographical region, the object type, duration of time, or time of day associated with the altered parameter; and the instructions to replace the parameter with the altered parameter based at least in part on detecting the feature comprises detecting that: the scenario associated with operation of the vehicle is within at least one of the geographical region, duration of time, or time of day; the vehicle has detected an object associated with the object type; or the scenario matches a scenario pattern specifying at least one of an arrangement of environmental features, a vehicle state, the object type; or an object position or velocity relative to the vehicle.

AI. The system of either paragraph AG or AH, wherein determining that the geographical region, scenario, time, or object type are common to the comfort indication and the one or more additional comfort indications comprises: clustering the comfort indication and the additional comfort indications and determining that the comfort indication and the one or more additional comfort indications are in a same cluster, determining whether a frequency of the comfort indication and the one or more additional comfort indications within a geographical area meets or exceeds a density threshold, determining that the comfort indication and the one or more additional comfort indications are associated with a same feature, or determining that a similarity between the comfort indication and the one or more additional comfort indications meets or exceeds a similarity threshold.

AJ. The system of any one of paragraphs AG-AI, wherein determining that the output of the subcomponent contributed to the comfort indication comprises: determining, based at least in part on the log data, a set of candidate actions upon which the vehicle based generation of the trajectory; determining, based at least in part on the set of candidate actions, that a candidate action output by the subcomponent of the vehicle is associated with a difference from a previous action of the vehicle that meets or exceeds a threshold magnitude.

AK. The system of paragraph AJ, wherein determining that the candidate action is associated with a difference from the previous action of the vehicle that meets or exceeds the threshold magnitude comprises determining that an acceleration or jerk required to implement the candidate action meets or exceeds an acceleration threshold or jerk threshold, or determining that a steering angle or steering rate deviates from a steering angle or steering rate by more than a threshold angle or threshold angular rate.

AL. The system of any one of paragraphs AG-AK, wherein altering the parameter comprises modifying: a cost function for determining a total cost associated with a candidate trajectory determined by the planning component to decrease a number of comfort indications generated in association with the vehicle; a minimum duration of time associated with the subcomponent output before the subcomponent output is implemented; a maximum acceleration; a maximum jerk; a gain of the drive system; a first dampening coefficient of the drive system; or a second dampening coefficient of a suspension of the vehicle.

AM. The system of paragraph AG, wherein the operations further comprise: determining, based at least in part on at least one of the log data or the candidate action output by the subcomponent, an event type associated with the comfort indication; determining, based at least in part on the event type, to alter at least one of a longitudinal parameter or a lateral parameter associated with ride comfort; and at least one of: determining a first modification to the longitudinal parameter to reduce at least one of a longitudinal acceleration or longitudinal jerk associated with candidate trajectories generated by the vehicle, or determining a second modification to the lateral parameter to reduce at least one of a lateral acceleration or lateral jerk associated with the candidate trajectories generated by the vehicle, wherein the first modification is different than the second modification.

AN. A non-transitory computer-readable medium storing processor-executable instructions that, when executed by one or more processors, cause the one or more processors to perform operations comprising: receiving a comfort indication associated with operation of a vehicle, wherein the comfort indication is associated with an interruption to ride smoothness; determining, based at least in part on log data associated with operation of the vehicle, a trajectory associated with the comfort indication; determining, based at least in part on the comfort indication and one or more additional comfort indications received from at least one of the vehicle or another vehicle, a feature associated with the comfort indication, wherein the feature identifies an output of a subcomponent of the vehicle that at least contributed to the comfort indication and at least one of a geographical region, scenario, time, or object type common to the comfort indication and the one or more additional comfort indications; altering, based at least in part on the comfort indication and the output of the subcomponent, a parameter of at least one of the subcomponent, a planning component, or a drive system of the vehicle to obtain an altered parameter; and transmitting, to the vehicle, the altered parameter and instructions to replace the parameter with the altered parameter based at least in part on detecting the feature AO. The non-transitory computer-readable medium of paragraph AN, wherein the operations further comprise determining, based at least in part on at least one of the log data or additional log data received from one or more additional vehicles, at least one of the geographical region, the object type, duration of time, or time of day associated with the altered parameter; and the instructions to replace the parameter with the altered parameter based at least in part on detecting the feature comprises detecting that: the scenario associated with operation of the vehicle is within at least one of the geographical region, duration of time, or time of day; the vehicle has detected an object associated with the object type; or the scenario matches a scenario pattern specifying at least one of an arrangement of environmental features, a vehicle state, the object type; or an object position or velocity relative to the vehicle.

AP. The non-transitory computer-readable medium of either paragraph AN or AO, wherein determining that the geographical region, scenario, time, or object type are common to the comfort indication and the one or more additional comfort indications comprises: clustering the comfort indication and the additional comfort indications and determining that the comfort indication and the one or more additional comfort indications are in a same cluster, determining whether a frequency of the comfort indication and the one or more additional comfort indications within a geographical area meets or exceeds a density threshold, determining that the comfort indication and the one or more additional comfort indications are associated with a same feature, or determining that a similarity between the comfort indication and the one or more additional comfort indications meets or exceeds a similarity threshold.

AQ. The non-transitory computer-readable medium of any one of paragraphs AN-AP, wherein determining that the output of the subcomponent contributed to the comfort indication comprises: determining, based at least in part on the log data, a set of candidate actions upon which the vehicle based generation of the trajectory; determining, based at least in part on the set of candidate actions, that a candidate action output by the subcomponent of the vehicle is associated with a difference from a previous action of the vehicle that meets or exceeds a threshold magnitude.

AR. The non-transitory computer-readable medium of paragraph AQ, wherein determining that the candidate action is associated with a difference from the previous action of the vehicle that meets or exceeds the threshold magnitude comprises determining that an acceleration or jerk required to implement the candidate action meets or exceeds an acceleration threshold or jerk threshold, or determining that a steering angle or steering rate deviates from a steering angle or steering rate by more than a threshold angle or threshold angular rate.

AS. The non-transitory computer-readable medium of any one of paragraphs AN-AR, wherein altering the parameter comprises modifying: a cost function for determining a total cost associated with a candidate trajectory determined by the planning component to decrease a number of comfort indications generated in association with the vehicle; a minimum duration of time associated with the subcomponent output before the subcomponent output is implemented; a maximum acceleration; a maximum jerk; a gain of the drive system; a first dampening coefficient of the drive system; or a second dampening coefficient of a suspension of the vehicle.

AT. The non-transitory computer-readable medium of any one of paragraphs AN-AS, wherein the operations further comprise: determining, based at least in part on at least one of the log data or the candidate action output by the subcomponent, an event type associated with the comfort indication; determining, based at least in part on the event type, to alter at least one of a longitudinal parameter or a lateral parameter associated with ride comfort; and at least one of: determining a first modification to the longitudinal parameter to reduce at least one of a longitudinal acceleration or longitudinal jerk associated with candidate trajectories generated by the vehicle, or determining a second modification to the lateral parameter to reduce at least one of a lateral acceleration or lateral jerk associated with the candidate trajectories generated by the vehicle, wherein the first modification is different than the second modification.

While the example clauses described above are described with respect to one particular implementation, it should be understood that, in the context of this document, the content of the example clauses can also be implemented via a method, device, system, computer-readable medium, and/or another implementation. Additionally, any of examples A-AT may be implemented alone or in combination with any other one or more of the examples A-AT.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
one or more processors; and
a memory storing processor-executable instructions that, when executed by the one or more processors, cause the vehicle to perform operations comprising:
receiving sensor data;
determining, by one or more subcomponents of the vehicle and based at least in part on the sensor data, a set of candidate actions;
determining, based at least in part on the set of candidate actions and the sensor data, a trajectory for controlling the vehicle;
receiving a comfort indication based at least in part on at least one of the sensor data, user input, or the trajectory, wherein the comfort indication is associated with an interruption to ride smoothness associated with operation of the vehicle;
determining, based at least in part on the comfort indication, a subcomponent from among the one or more subcomponents that output a candidate action, which upon implementation by the vehicle, would result in an acceleration or deceleration that meets or exceeds a threshold;
altering, based at least in part on the candidate action, a parameter of at least one of a planning component or a drive system of the vehicle to obtain an altered parameter, the altered parameter being configured to decrease an amount that output of the subcomponent influences trajectories generated by the vehicle; and
controlling the vehicle based at least in part on the altered parameter.

2. The vehicle of claim 1, wherein the interruption to ride smoothness comprises at least one of a momentary deceleration, a momentary acceleration, momentarily initiating a turn or momentarily changing a steering angle, or momentary activation of an emitter of the vehicle.

3. The vehicle of claim 1, wherein the parameter comprises at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

4. The vehicle of claim 1, wherein the operations further comprise:
determining, based at least in part on the sensor data and a task associated with the subcomponent, an event type; and
determining, based at least in part on the event type, to alter longitudinal tolerances or lateral tolerances associated with ride comfort;
wherein altering the parameter comprises modifying the planning component or the drive system to at least one of:
decrease (1) at least one of longitudinal acceleration or longitudinal jerk, or (2) at least one of lateral acceleration or lateral jerk associated with a candidate trajectory generated by the planning component, or
decrease a cost determined in association with the candidate trajectory according to reduction of (1) at least one of longitudinal acceleration or longitudinal jerk, or (2) at least one of lateral acceleration or lateral jerk.

5. The vehicle of claim 1, where the operations further comprise at least one of:
activating suspension of the vehicle or modifying a dampening coefficient associated with the suspension in anticipation of receiving an additional comfort indication, or
activating a passenger restraint in anticipation of receiving the additional comfort indication.

6. The vehicle of claim 1, wherein:
the operations further comprise:
determining, based at least in part on the sensor data, a jerk associated with operating the vehicle according to the trajectory; or
determining that the subcomponent output the candidate action for a duration of time that is less than a threshold duration of time; and
receiving the comfort indication is based at least in part on:
determining that the jerk meets or exceeds a jerk threshold, or determining that the subcomponent output the candidate action for the duration of time that is less than the threshold duration of time.

7. A method comprising:

receiving sensor data;

determining, by one or more subcomponents of a vehicle and based at least in part on the sensor data, a set of candidate actions;

determining, based at least in part on the set of candidate actions and the sensor data, a trajectory for controlling the vehicle;

receiving a comfort indication, wherein the comfort indication is associated with an interruption to ride smoothness associated with operation of the vehicle;

determining, based at least in part on the comfort indication, a subcomponent from among the one or more subcomponents that output a candidate action, which upon implementation by the vehicle, would result in an acceleration or deceleration that meets or exceeds a threshold;

altering, based at least in part on the candidate action, a parameter of at least one of a planning component or a drive system of the vehicle to obtain an altered parameter; and controlling the vehicle based at least in part on the altered parameter.

8. The method of claim 7, wherein the parameter comprises at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

9. The method of claim 7, further comprising:

activating suspension of the vehicle or modifying a dampening coefficient associated with the suspension in anticipation of receiving an additional comfort indication, or activating a passenger restraint in anticipation of receiving the additional comfort indication.

10. The method of claim 7, further comprising:

receiving an indication that the vehicle is operating in a developer mode; and at least one of:

displaying, via a display of the vehicle, a representation of the vehicle, an identification of the subcomponent, and a representation of the candidate action or the trajectory generated based at least in part on the candidate action; or transmitting a message to a computing device associated with a passenger, wherein the message comprises an indication of at least one of a task associated with the subcomponent or an object in or state of an environment associated with the vehicle that caused the comfort indication.

11. The method of claim 7, further comprising:

receiving new sensor data;

determining, based at least in part on the new sensor data and the altered parameter, candidate trajectories based at least in part on the new sensor data;

determining, based at least in part on the comfort indication, a cost associated with a first trajectory; and controlling the vehicle using the first trajectory based at least in part on the cost associated with the first trajectory.

12. The method of claim 11, wherein:

determining the cost is based at least in part on a cost function that determines the cost associated with the trajectory based at least in part on the sensor data; and altering the parameter comprises modifying one or more parameters of the cost function to decrease costs of trajectories that reduce a likelihood of receiving an additional comfort indication or are associated with a jerk, acceleration, gain, or dampening coefficient that satisfies a respective threshold.

13. The method of claim 7, further comprising:

determining, based at least in part on the sensor data and a task associated with the subcomponent, an event type; and determining, based at least in part on the event type, to alter longitudinal tolerances or lateral tolerances associated with ride comfort;

wherein altering the parameter comprises modifying the planning component or the drive system to at least one of:

decrease (1) at least one of longitudinal acceleration or longitudinal jerk, or (2) at least one of lateral acceleration or lateral jerk associated with a candidate trajectory generated by the planning component, or decrease a cost determined in association with the candidate trajectory according to reduction of (1) at least one of longitudinal acceleration or longitudinal jerk, or (2) at least one of lateral acceleration or lateral jerk.

14. A non-transitory computer-readable medium storing processor-executable instructions that, when executed by one or more processors, causes the one or more processors to perform operations comprising:

receiving sensor data;

determining, by one or more subcomponents of a vehicle and based at least in part on the sensor data, a set of candidate actions;

determining, based at least in part on the set of candidate actions and the sensor data, a trajectory for controlling the vehicle;

receiving a comfort indication, wherein the comfort indication is associated with an interruption to ride smoothness associated with operation of the vehicle;

determining, based at least in part on the comfort indication, a subcomponent from among the one or more subcomponents that output a candidate action, which upon implementation by the vehicle, would result in an acceleration or deceleration that meets or exceeds a threshold;

altering, based at least in part on the candidate action, a parameter of a trajectory generation and selection system of the vehicle to obtain an altered parameter; and controlling the vehicle based at least in part on the altered parameter.

15. The non-transitory computer-readable medium of claim 14, wherein the operations further comprise:

activating suspension of the vehicle or modifying a dampening coefficient associated with the suspension in anticipation of receiving an additional comfort indication, or activating a passenger restraint in anticipation of receiving the additional comfort indication.

16. The non-transitory computer-readable medium of claim 14, wherein the operations further comprise at least one of:
- displaying, via a display of the vehicle, a representation of the vehicle, an identification of the subcomponent, and a representation of the candidate action or the trajectory generated based at least in part on the candidate action; or
- transmitting a message to a computing device associated with a passenger, wherein the message comprises an indication of at least one of a task associated with the subcomponent or an object in or state of an environment associated with the vehicle that caused the comfort indication.

17. The non-transitory computer-readable medium of claim 14, wherein the trajectory is a first trajectory and the operations further comprise:
- receiving new sensor data;
- determining, based at least in part on the new sensor data and the altered parameter, a second trajectory; and
- controlling the vehicle using the second trajectory based at least in part on determining that a cost associated with the first trajectory is less than at least one of a cost threshold or a second cost associated with a second trajectory.

18. The non-transitory computer-readable medium of claim 14, wherein:
- altering the parameter comprises modifying a second parameter of a cost function that determines a cost associated with a candidate trajectory of the set of candidate trajectories; and
- modifying the second parameter comprises determining an updated parameter to decrease at least one of a cost associated with a ride comfort metric associated with the candidate trajectory or a total cost associated with the candidate trajectory, such that the total cost decreases as ride smoothness increases.

19. The non-transitory computer-readable medium of claim 18, wherein the ride comfort metric is based at least in part on at least one of a minimum duration of time associated with the subcomponent output before the subcomponent output is implemented, a maximum acceleration, a maximum jerk, a gain of a drive system of the vehicle, a first dampening coefficient of the drive system, a second dampening coefficient of a suspension of the vehicle, or a cost associated with generating one or more candidate trajectories based at least in part on a new set of candidate actions and sensor data.

20. The non-transitory computer-readable medium of claim 14, wherein the operations further comprise:
- determining, based at least in part on the sensor data and a task associated with the subcomponent, an event type; and
- determining, based at least in part on the event type, to alter longitudinal tolerances or lateral tolerances associated with ride comfort;
- wherein altering the parameter comprises modifying a planning component or a drive system of the vehicle to decrease (1) at least one of longitudinal acceleration or longitudinal jerk, or (2) at least one of lateral acceleration or lateral jerk.

* * * * *